(12) United States Patent
Xian et al.

(10) Patent No.: US 11,068,156 B2
(45) Date of Patent: Jul. 20, 2021

(54) DATA PROCESSING METHOD, APPARATUS, AND SMART TERMINAL

(71) Applicant: BANMA ZHIXING NETWORK (HONGKONG) CO., LIMITED, Kowloon (HK)

(72) Inventors: Ying Xian, Beijing (CN); Huan Zeng, Beijing (CN); Kezheng Liao, Beijing (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/000,666

(22) Filed: Jun. 5, 2018

(65) Prior Publication Data

US 2019/0079665 A1    Mar. 14, 2019

Related U.S. Application Data

(63) Continuation-in-part of application No. PCT/CN2016/107594, filed on Nov. 29, 2016.

(30) Foreign Application Priority Data

Dec. 9, 2015 (CN) .......................... 201510906659.8

(51) Int. Cl.
*G06F 3/0488* (2013.01)
*G06F 3/0484* (2013.01)
(Continued)

(52) U.S. Cl.
CPC .......... *G06F 3/04883* (2013.01); *G06F 3/017* (2013.01); *G06F 3/0482* (2013.01);
(Continued)

(58) Field of Classification Search
CPC .. G06F 3/04883; G06F 3/04847; G06F 3/167; G06F 3/017; H04M 1/274583
See application file for complete search history.

(56) References Cited

U.S. PATENT DOCUMENTS 5,567,075 A    10/1996    Allen
6,388,665 B1 *   5/2002   Linnett ............... G06F 3/04817
                                                            345/473

(Continued)

FOREIGN PATENT DOCUMENTS

CN    102917117 A    2/2013
CN    103559046 A    2/2014
(Continued)

*Primary Examiner* — Daeho D Song
(74) *Attorney, Agent, or Firm* — Van Pelt, Yi & James LLP

(57) ABSTRACT

Embodiments of the present application relate to a method, device, and system for processing data. The method includes displaying, by one or more processors associated with a terminal, a system control, the system control comprising one or more interface elements associated with a current context of the terminal, and a screen of the terminal displays the system control and at least part of an interface for a current application; receiving, by the one or more processors associated with the terminal, an input to the system control; determining an operating instruction based at least in part on the input to the system control; and performing, by the one or more processors associated with the terminal, one or more operations based at least in part on the operating instruction.

28 Claims, 10 Drawing Sheets

(51) Int. Cl.

| | | |
|---|---|---|
| *G06F 3/01* | (2006.01) | |
| *H04M 1/2745* | (2020.01) | |
| *G06F 3/0482* | (2013.01) | |
| *G06F 9/451* | (2018.01) | |
| *G06F 3/0481* | (2013.01) | |
| *H04M 1/2746* | (2020.01) | |
| *H04M 1/27475* | (2020.01) | |
| *H04M 1/72403* | (2021.01) | |
| *G06F 3/16* | (2006.01) | |
| *G06F 9/445* | (2018.01) | |

(52) U.S. Cl.
CPC ........ *G06F 3/0488* (2013.01); *G06F 3/04817* (2013.01); *G06F 3/04847* (2013.01); *G06F 3/167* (2013.01); *G06F 9/453* (2018.02); *H04M 1/2746* (2020.01); *H04M 1/27475* (2020.01); *H04M 1/72403* (2021.01); *G06F 9/44505* (2013.01); *G06F 2203/0381* (2013.01); *H04M 2250/22* (2013.01); *H04M 2250/74* (2013.01)

(56) References Cited

U.S. PATENT DOCUMENTS

| | | | | |
|---|---|---|---|---|
| 7,798,903 | B2* | 9/2010 | Pirich | A63F 13/10 463/36 |
| 8,073,931 | B2* | 12/2011 | Dawes | G06Q 50/16 709/219 |
| 8,170,537 | B1* | 5/2012 | Bort | H04M 1/271 455/414.4 |
| 8,660,849 | B2* | 2/2014 | Gruber | H04M 1/72484 704/275 |
| 8,682,667 | B2* | 3/2014 | Haughay | G10L 17/00 704/246 |
| 9,430,130 | B2* | 8/2016 | Matthews | G06F 3/04842 |
| 9,531,862 | B1 | 12/2016 | Vadodaria | H04L 51/32 |
| 9,594,851 | B1* | 3/2017 | Chechik | G06F 16/90324 |
| 9,719,797 | B2* | 8/2017 | Fino | G01C 21/362 |
| 9,842,311 | B2* | 12/2017 | Pearce | G06F 3/0482 |
| 9,906,641 | B2* | 2/2018 | Kim | H04W 4/12 |
| 10,354,256 | B1* | 7/2019 | McInerny | G06T 13/40 |
| 2003/0191591 | A1* | 10/2003 | Liyoshi | G01R 27/28 702/68 |
| 2005/0268234 | A1* | 12/2005 | Rossi, Jr. | G06F 9/453 715/705 |
| 2006/0247915 | A1 | 11/2006 | Bradford | |
| 2007/0157093 | A1* | 7/2007 | Karcher | G06F 9/453 715/707 |
| 2008/0034318 | A1* | 2/2008 | Louch | G06F 3/0486 715/781 |
| 2008/0174570 | A1* | 7/2008 | Jobs | G06F 3/04886 345/173 |
| 2009/0193358 | A1* | 7/2009 | Mernyk | G06F 8/65 715/804 |
| 2010/0185989 | A1* | 7/2010 | Shiplacoff | G06F 3/0416 715/856 |
| 2010/0289825 | A1* | 11/2010 | Shin | G06F 3/04845 345/667 |
| 2010/0317371 | A1 | 12/2010 | Westerinen | |
| 2010/0330972 | A1* | 12/2010 | Angiolillo | H04M 1/2746 455/418 |
| 2011/0090255 | A1* | 4/2011 | Wilson | G06F 3/04817 345/647 |
| 2011/0093580 | A1* | 4/2011 | Nagasaka | H04L 67/36 709/223 |
| 2011/0109567 | A1* | 5/2011 | Kim | G06F 3/0416 345/173 |
| 2011/0131491 | A1* | 6/2011 | Lu | G06F 9/453 715/708 |
| 2011/0276925 | A1* | 11/2011 | Tumanov | G06Q 10/107 715/856 |
| 2012/0110579 | A1 | 5/2012 | Bullen | |
| 2012/0139862 | A1* | 6/2012 | Li | G06F 3/04883 345/173 |
| 2012/0259845 | A1* | 10/2012 | Matejka | G09B 7/02 707/723 |
| 2012/0265528 | A1* | 10/2012 | Gruber | G10L 15/183 704/235 |
| 2013/0036117 | A1* | 2/2013 | Fisher | G06F 16/487 707/736 |
| 2013/0036388 | A1* | 2/2013 | Kirkpatrick | G06F 3/04883 715/856 |
| 2013/0047126 | A1* | 2/2013 | Sareen | G06F 3/04886 715/863 |
| 2013/0050118 | A1* | 2/2013 | Kjelsbak | G06F 3/017 345/173 |
| 2013/0061172 | A1* | 3/2013 | Huang | G06F 3/04817 715/808 |
| 2013/0067389 | A1* | 3/2013 | Jin | G06F 3/0486 715/783 |
| 2013/0212529 | A1* | 8/2013 | Amarnath | G06F 3/0482 715/810 |
| 2013/0227471 | A1* | 8/2013 | Cha | G06F 3/0484 715/790 |
| 2013/0290851 | A1 | 10/2013 | Svinth | |
| 2014/0025367 | A1 | 1/2014 | Dunko | |
| 2014/0168062 | A1* | 6/2014 | Katz | G06F 3/0484 345/156 |
| 2014/0173495 | A1* | 6/2014 | Chang | G06F 3/04883 715/776 |
| 2014/0223381 | A1* | 8/2014 | Huang | G06F 3/04883 715/863 |
| 2014/0237367 | A1* | 8/2014 | Jung | G06F 3/04845 715/728 |
| 2014/0313143 | A1* | 10/2014 | Jung | G06F 3/04817 345/173 |
| 2014/0317502 | A1* | 10/2014 | Brown | G06F 9/453 715/706 |
| 2014/0365912 | A1* | 12/2014 | Shaw | G06F 3/0488 715/748 |
| 2014/0365944 | A1* | 12/2014 | Moore | G06Q 30/0261 715/772 |
| 2015/0062027 | A1* | 3/2015 | Yang | G06F 3/0483 345/173 |
| 2015/0121284 | A1* | 4/2015 | Wang | G06F 3/04886 715/773 |
| 2015/0227308 | A1* | 8/2015 | Kim | G06F 3/04886 715/769 |
| 2015/0253955 | A1* | 9/2015 | Chiba | G06F 3/041 345/173 |
| 2015/0286401 | A1* | 10/2015 | Ma | G06F 3/0482 715/863 |
| 2015/0286487 | A1* | 10/2015 | Glass | G06F 3/0484 715/707 |
| 2015/0301729 | A1* | 10/2015 | Wang | G06F 9/453 715/707 |
| 2016/0034132 | A1* | 2/2016 | Huang | G06F 3/0488 345/173 |
| 2016/0044138 | A1* | 2/2016 | Nagasaka | G06F 8/60 709/220 |
| 2016/0057587 | A1* | 2/2016 | Liu | H04L 51/02 455/466 |
| 2016/0094979 | A1* | 3/2016 | Naik | H04W 4/02 455/414.1 |
| 2016/0253086 | A1* | 9/2016 | Jiang | G06F 3/0482 715/790 |
| 2018/0011549 | A1* | 1/2018 | Fu | G06F 3/018 |

FOREIGN PATENT DOCUMENTS

| | | |
|---|---|---|
| CN | 103744575 A | 4/2014 |
| CN | 103970396 A | 8/2014 |
| CN | 104049849 A | 9/2014 |
| EP | 1821177 A1 | 8/2007 |
| EP | 2672781 A1 | 12/2013 |

* cited by examiner

800

900

DATA PROCESSING METHOD, APPARATUS, AND SMART TERMINAL

CROSS REFERENCE TO OTHER APPLICATIONS

This application is a continuation-in-part of and claims priority to International (PCT) Application No. PCT/CN2016/107594 entitled DATA PROCESSING METHOD AND APPARATUS, AND SMART TERMINAL, filed Nov. 29, 2016 which is incorporated herein by reference for all purposes, which claims priority to China Application No. 201510906659.8 entitled A METHOD, MEANS, AND SMART TERMINAL FOR PROCESSING DATA, filed Dec. 9, 2015 which is incorporated herein by reference for all purposes.

FIELD OF THE INVENTION

The present application relates to a field of terminal technology. In particular, the present application relates to a method, device, a smart terminal, and system for processing data.

BACKGROUND OF THE INVENTION

As terminal technology develops, an increasing number of people are adopting smart terminals. Users can install various types of applications on smart terminals. Different applications can have the same or different functions.

As an example, a player application can play audio and/or video, a shopping application enables online shopping, and a notebook application records itineraries and plans. Different operations can be executed on smart terminals using differing applications. Users can selectively use the applications to execute desired operations. According to the related art, some operations can be executed only if a user exits the current interface. For example, to check the delivery status of an order while shopping, a user is generally required to exit a current interface for shopping to check the delivery status of an order. In addition, different applications are independent of each other. If, while using one application, a user wishes to call another application, it is generally necessary to look up the other application after exiting the first application. Accordingly, performing application operations often involves numerous steps and tends to be inefficient and restrictive.

Therefore, a method, device, smart terminal, and system for performing more operations on a smart terminal in a more efficient manner are desired.

BRIEF DESCRIPTION OF THE DRAWINGS

Various embodiments of the invention are disclosed in the following detailed description and the accompanying drawings.

DETAILED DESCRIPTION

Figure 1:
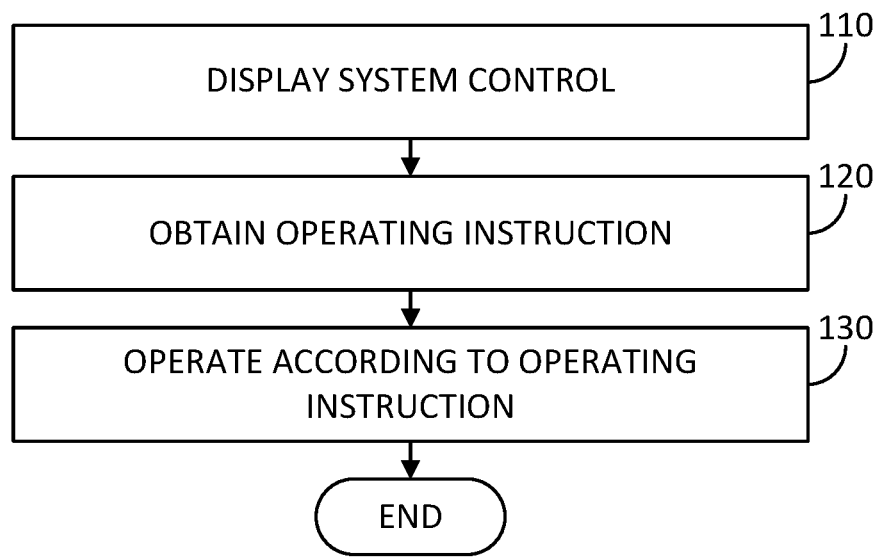
FIG. 1 is a flowchart of a method for processing data according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

To make the above-described objectives, features, and advantages of the present application plainer and easier to understand, the present application is explained in further detail below in light of the drawings and specific embodiments.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, an information center (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

Various embodiments address the technical problem of the related art associated with annoying, numerous steps in performing operations on a smart terminal. In some embodiments, a system control is provided for performing operations within an application or across applications. The operating steps that a user performs within an application or between applications are simplified by displaying a system control comprising system elements associated with the current context and receiving an operating instruction provided as feedback through the system control. The system control assists the user in executing the operation and thus increases operating efficiency.

In some embodiments, the system control is universal to a smart terminal. For example, the system control can be invoked when any application of the smart terminal is running. In some embodiments, the system control is configurable to only be invoked for a defined subset of applications on the smart terminal.

FIG. 1 is a flowchart of a method for processing data according to various embodiments of the present application.

Referring to FIG. 1, process 100 for processing data is provided. Process 100 can be implemented in connection with process 400 of FIG. 4, process 500 of FIG. 5, process 600 of FIG. 6, process 800 of FIG. 8, and/or process 900 of FIG. 9. Process 100 can implement interface 200 of FIG. 2, interface 300 of FIG. 3, and/or interface 700 of FIG. 7. Process 100 can be implemented by computer system 1000 of FIG. 10. Process 100 can be implemented by an operating system running on a terminal.

At 110, a system control is displayed. The smart terminal displays the system control on a screen thereof. The system control is displayed on a graphical user interface of the smart terminal. In some embodiments, the system control comprises interface elements associated with a current context of the smart terminal. The current context of the terminal can be determined based on a location, a time, one or more applications running on the terminal, a user profile associated with the terminal, historical information associated with a user of the terminal, an amount of battery remaining (e.g., a percentage of remaining battery power), etc. The interface elements comprised in the system control are different from elements displayed in an application. For example, the system control can be displayed as an overlay to the application currently running. In some embodiments, an input to an interface element in the system control is independent of the application (e.g., currently running or being displayed) except in so far as the system control provides information to the application and/or causes the application to perform a function. As an example, input to an interface element of the system control corresponds to an input to the system control not the application. However, based on the function associated with the interface element being selected or subject to an input, the application can receive a corresponding input or information from the system control.

While using a smart terminal, a user may select an application from a main interface of the smart terminal such as a desktop and may use the application to execute a corresponding operation. A smart terminal is configured with a smart control to enable a more efficient and effective control of the smart terminal. For example, the smart control facilitates the performing of operations within an application and across applications. In some embodiments, a system-level assistant control (e.g., a system control) is added to the smart terminal. The system control is a system-level control which can be displayed in various application contexts of the smart terminal. For example, the system control can be displayed on a system desktop or displayed while an application is in use. Display of the system control can be invoked in response to one or more predefined inputs or contexts. For example, in response to a user inputting one or more predefined inputs associated with the system control, the smart terminal displays the system control.

In some embodiments, the system control is displayed in connection with assisting a user of a smart terminal to perform one or more operations, or otherwise control the smart phone. For example, the smart control is invoked (e.g., displayed) in connection with the user executing a target input, such as making a sliding movement starting at the base or shaking the terminal, in the current context. The system control can detect that the user has a query need or some other need. For example, the system control can determine a current context of the smart terminal, and based on the current context and one or more inputs that the smart terminal obtains from the user, the system control can determine whether the user has a query or another predefined need.

The smart terminal can store a mapping of predefined contexts to predefined functions. For example, invocation of a query can be mapped to one or more predefined contexts such as one or more predefined applications running, or one or more predefined applications running in conjunction with the smart terminal obtaining one or more predefined inputs, etc. The mapping of predefined contexts to predefined functions can be updated based on user behavior or historical information for operation of the smart terminal. In some embodiments, the system control can automatically determine whether to invoke a function in response to querying the mapping of predefined contexts to predefined functions to determine whether a predefined function matches a current context of the smart terminal. As an example, if the system control determines that the mapping of predefined contexts to predefined functions has a predefined function that matches the current context of the smart terminal, the system control can invoke the corresponding predefined function. As another example, if the system control determines that the mapping of predefined contexts to predefined functions has a predefined function that matches the current context of the smart terminal, the system control can provide (e.g., display) to the user an element recommending the corresponding predefined function. The mapping of predefined contexts to predefined functions can be configured based at least in part on user settings or preferences.

In some embodiments, the system control displays interface elements. The interface elements displayed by the system control can assist the user in executing corresponding functions, such as executing operations in the current context or calling another application. The interface elements displayed by the system control are associated with the current context.

In some embodiments, the interface elements are selectable. For example, if a user selects the interface element displayed by the system control, the smart terminal can perform a function corresponding to the interface element.

At 120, an operating instruction is obtained. The smart terminal can obtain the operating instruction based on an input to the smart terminal by a user. For example, a user can make an input to a touch screen of the smart terminal. As an example, the user can select the interface element displayed by the system control. The system control can obtain the operating instruction in response to the user input. The operating instruction can be provided as feedback from a user through the system control.

In some embodiments, the operating instruction is obtained in response to a user triggering an interface element (e.g., that is provided by the system control). The user can trigger an interface element by selecting the interface element (e.g., touching a touch screen of the smart terminal at an area on which the interface element is displayed or within a predefined proximity thereof).

At 130, the smart terminal is operated according to the operating instruction. In some embodiments, in response to obtaining the operating instruction, the smart terminal performs one or more operations. For example, the smart terminal can call one or more functions, launch one or more applications, etc.

After the system control is displayed, the user can trigger an interface element in the system control to execute a corresponding function. Therefore, the system control is triggered to generate a corresponding operating instruction. The operating instruction corresponding to the user triggering (e.g., selecting) the interface element is received, and a response is given to the operating instruction. The system control may, for example, process the operating instruction, or it may forward the operating instruction to an application of the current context for processing. Presenting the system control (e.g., the interface elements) and obtaining operating instructions based on the user interaction with the interface element (e.g., the user triggering the interface element) simplifies user operation steps within an application or between applications and increases efficiency.

In summary, the operating steps that a user performs within an application or between applications are simplified by displaying a system control comprising interface elements associated with the current context and receiving an operating instruction provided as feedback through the system control. The system control assists the user in executing the operation and thus increases operating efficiency.

According to various embodiments, while using a smart terminal, a user can start a system control in one or more contexts in response to one or more inputs by the user. If the system control is, for example, a personal assistant, then the personal assistant does not serve as a single application. In some embodiments, the personal assistant is part of the operating system. For example, the personal assistant can be a function of the operating system, a routine on the operating system, or a process running by/on the operating system. As another example, the personal assistant is not an application (e.g., an application that is different from the operating system). The system control can be called up at any time in various application contexts to provide the user with help. In some embodiments, the system control can be activated in any context of the smart terminal.

The smart control can run in the background and be invoked in response to one or more predefined inputs or in response to the occurrence of one or more contexts. The one or more predefined inputs can be configurable (e.g., by a user or an administrator). In response to a user obtaining an input from the user, the smart terminal can determine whether the input corresponds to one of the one or more predefined inputs associated with invoking the smart terminal, and in response to determining that the input corresponds to one of the predefined inputs, the smart terminal can invoke the system control. In some embodiments, invocation of the system control includes displaying the system control or a notification for the system control on the user interface. For example, if the system control is running in the background and the smart terminal determines that an obtained input corresponds to one of the predefined inputs, the system control is displayed. As another example, if the system control is not running in the background and the smart terminal determines that an obtained input corresponds to one of the predefined inputs, the smart terminal (e.g., the operating system of the smart terminal) launches the system control. The one or more predefined inputs for invoking the system control can include a sliding up touch from the screen base.

According to various embodiments, whatever the application context, the smart terminal can start a personal assistant system control (e.g., the system control) through target input such as by sliding up from the screen base. The system control can present different recommendation results depending on the application context in which the user is currently located (e.g., the application currently being displayed to the user). For example, if a system control is started when the current application (e.g., the application currently being displayed to the user) is a contacts application, the contacts who were most recently used will be recommended. As an example, the most recently used contacts include most recently contacted contacts, most recently contacted contacts according to a particular communication medium (e.g., email, short messaging service (SMS), instant messaging (IM), call, etc.). As another example, the most recently used contacts include contacts most recently viewed or selected. The system control can recommend a threshold number of the contacts who were most recently used. In some embodiments, the system control can receive voice input from the user to complete the user's request. For example, in response to the system control being invoked, a microphone on the smart terminal can be activated to obtain a voice input for selection of a recommendation of the system control (e.g., a particular contact, etc.).

Figure 2:
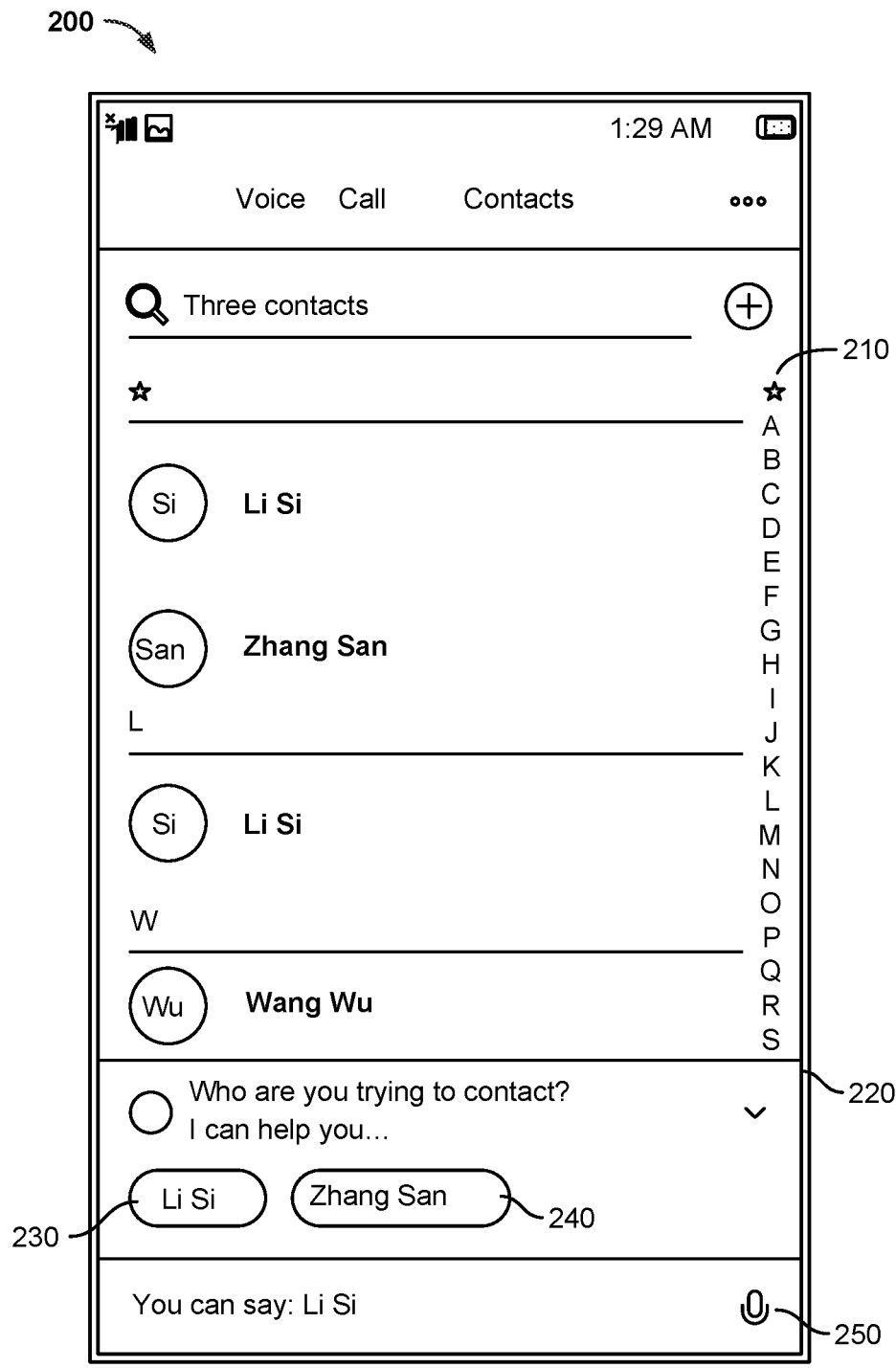
FIG. 2 is a diagram of an interface according to various embodiments of the present application.

FIG. 2 is a diagram of an interface according to various embodiments of the present application.

Referring to FIG. 2, interface 200 is provided. Interface 200 can be implemented in connection with process 100 of FIG. 1, process 400 of FIG. 4, process 500 of FIG. 5, process 600 of FIG. 6, process 800 of FIG. 8, and/or process 900 of FIG. 9. Interface 200 can be implemented in connection with interface 300 of FIG. 3 and/or interface 700 of FIG. 7. Interface 200 can be implemented by computer system 1000 of FIG. 10.

As illustrated in FIG. 2, interface 200 includes a system control (e.g., a personal assistant system control) 220 in connection with a contacts application 210. For example, system control 220 is invoked in response to, or in the context of, a target input being input in a contact directory application 210 (e.g., while the smart terminal displays the contact directory). For example, a user setting or preference can be configured such that the system control 220 is invoked in response to the target input being input (e.g., the system control will pop-up automatically in response to detecting the target input). As another example, the user setting or preference can be configured such that in one or more contexts, the system control will not be invoked (e.g., displayed) in response to the target input being input (e.g., the system control will not pop up or will pop up after a user provides an input of a confirmation that the system control 220 is to be invoked). The display interface of the system control 220 displays interface elements, in this case the information tags "Li Si"230 and "Zhang San" 240. The system control 220 provides the information tags as a recommendation for the user. An information tag can correspond to an interface element that is a recommendation generated by the system control. The information tag can be displayed as an interface element to the user and can be a link such that in response to the information tag being triggered or selected, the system control performs a corresponding operation or function. For example, in response to the target input in the contact directory application, the system control is invoked and recommends "Li Si"230 and "Zhang San" 240 as contacts for the user. In some embodiments, system control 220 displays a voice input button 250 the selection of which invokes a function for obtaining a voice input as an input (e.g., to enable the user to make an input to the system control 220 via a voice input). The system control can display the voice input button 250 in the right lower corner. In response to selection of the voice input button 250, the user can input a voice input directly to the smart terminal. The information tags 230 or 240 can be selectable elements such that selection of one of the information tags 230 or 240 causes the smart terminal to perform a corresponding operation. The user can then select an information tag (e.g., 230 or 240) or the voice input button within the system control 220 to trigger a corresponding operating instruction. The system control 220 assists the user in executing the operation. For example, by selecting (e.g., clicking on) the "Li Si" information tag 230, the user can generate an operating instruction to trigger (e.g., select) interface element "Li Si" 230 and can forward the contact information corresponding to trigger tag 230, an indication of selection of trigger tag 230, or an identifier corresponding to the trigger tag 230 to the contact directory application. In response to receiving the contact information corresponding to trigger tag 230, an indication of selection of trigger tag 230, or an identifier corresponding to the trigger tag 230, the contact directory application presents the contact information of "Li Si" or directly telephones "Li Si." The operation instruction that is generated (or communicated) in response to selection of an information tag is configurable. For example, a user can configure the operation instruction via a settings user interface. The operation instruction can be configured on an application-by-application basis, or be configured on an application type-by-application type basis, etc. In some embodiments, an application developer can configure the default operation instructions generated in response to a selection via a system control for the application. The operation instruction can be configured based on user preferences or settings.

As another example with reference to FIG. 2, in response to selection of the voice input button 250, the user records "telephone Zhang San." After recognizing these speech signals, the system control 220 forwards a corresponding command or information to the contact directory application, which telephones "Zhang San." The system control 220 can recognize the speech signals based on a processing of the speech signals input to a microphone of the terminal. The terminal can obtain the speech signals, and the speech signals can be processed. As an example, processing the speech signals includes processing to filter noise out of the speech signals. As another example, processing the speech signals includes converting the speech signals to text based on a sound-to-text processing. In some embodiments, the system control invokes a process or function to process the speech signals. For example, the process or function can be provided by the operating system and can be called by another application or function. Processing of the speech signals can include processing the text input obtained in connection with performing sound-to-text processing on the text signals. The text input corresponding to the speech signals can be processed to identify one or more keywords. The one or more keywords can be identified based at least in part on a context. For example, the one or more keywords can be identified based on user settings, user preferences, user historical information (e.g., how the user has operated the terminal in the past), an application running, etc. One or more commands can be determined based on the text input. For example, one or more commands can be determined based at least in part on the one or more keywords identified.

In some embodiments, if the current context is a contact directory application, the information tag comprises at least one of the following: frequently-used contact tag, most recently contacted contacts, recently-called contact tag, and contact group tag. The system control can provide one or more function buttons the selection of which invokes a corresponding operation to be performed. As an example, if the current context is a contact directory application, the function button comprises a voice input button. The system control can provide a threshold number of information tags. The threshold number of information tags provided by the system control can be configurable. Frequently-used contacts can include contacts in regular communication with the user (e.g., via one or more communication mediums). Recently-called contacts can include contacts who communicated with the user within the most recent time interval such as one day. A contact group can include a preconfigured contact group, such as friends, family, or co-workers.

In some embodiments, system control 220 comprises an element the selection of which minimizes system control 220. For example, system control 220 can comprise a downward arrow in a top left corner of the system control 220. In response to selection of the element, the smart terminal can minimize the system control or close the system control, and the smart terminal can return to the current context (e.g., continue displaying the application currently running).

Figure 3:
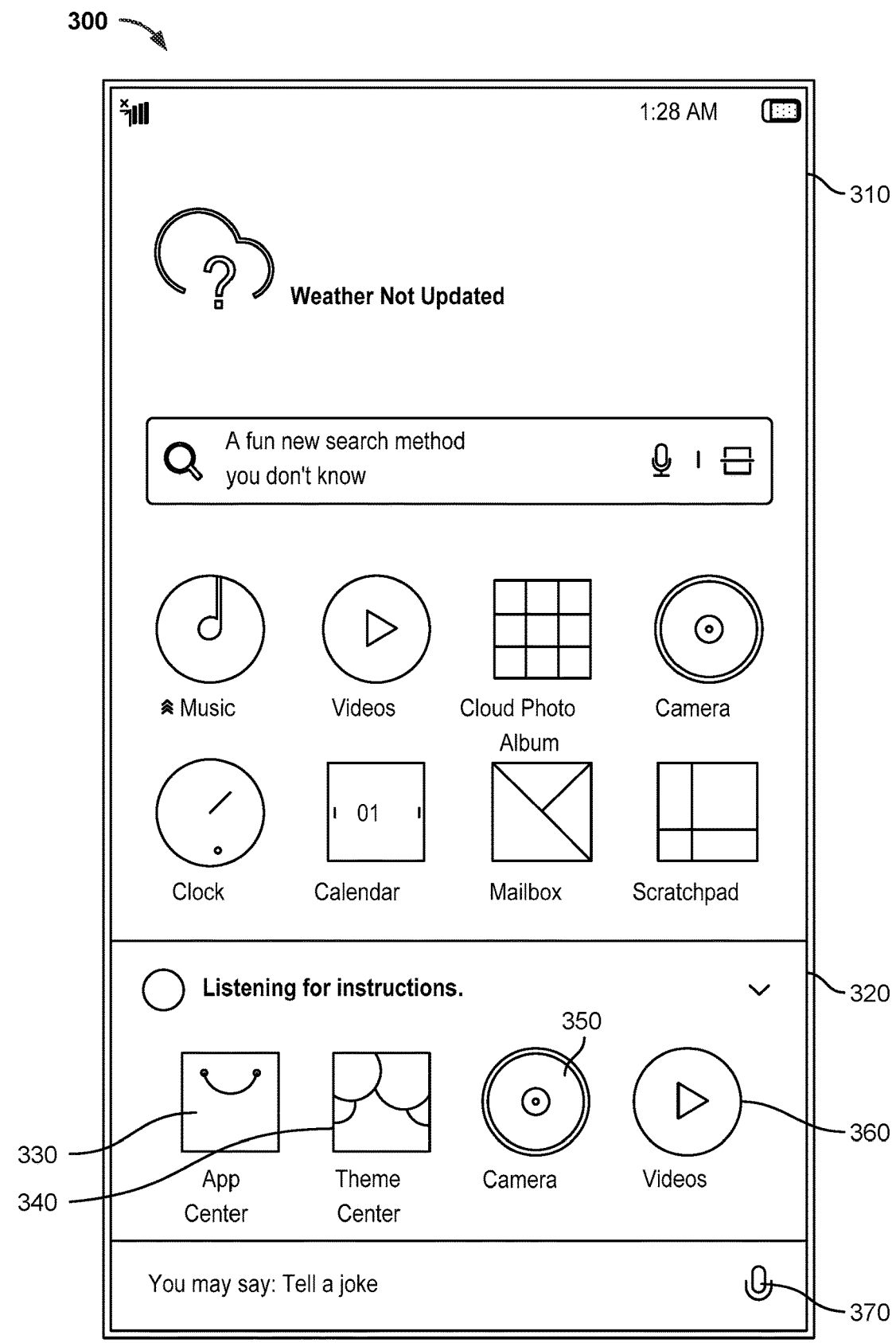
FIG. 3 is a diagram of an interface according to various embodiments of the present application.

FIG. 3 is a diagram of an interface according to various embodiments of the present application.

Referring to FIG. 3, interface 300 is provided. Interface 300 can be implemented in connection with process 100 of FIG. 1, process 400 of FIG. 4, process 500 of FIG. 5, process 600 of FIG. 6, process 800 of FIG. 8, and/or process 900 of FIG. 9. Interface 300 can be implemented in connection with interface 200 of FIG. 2 and/or interface 700 of FIG. 7. Interface 300 can be implemented by computer system 1000 of FIG. 10.

As illustrated in FIG. 3, interface 300 includes a system control 320 in connection with a system desktop 310. For example, system control 320 is invoked in response to a target input being input when the smart terminal displays the system desktop 310. The smart terminal (e.g., system control 320) determines interface elements associated with system control 320 that are displayed on interface 300 with (e.g., as an overlay to) system desktop 310. As an example, the smart terminal (e.g., system control 320) can determine the interface elements to provide in connection with system desktop 310 before the system control 320 is invoked in response to a target input. As another example, the smart terminal (e.g., system control 320) can determine the interface elements to provide in connection with system desktop 310 in response to a target input being received. In some embodiments, if a target input is received while a smart terminal is displaying the system desktop 310, the smart terminal determines the interface elements associated with the current interface information and customizes a system control 320 display interface for display. For example, the system control 320 displays "Application Center" 330, "Theme Center" 340, "Camera" 350, "Videos" 360, and other such information tags. Interface elements 330-360 can be selectable such that selection of one of the interface elements 330-360 causes a corresponding operation to be performed. System control 320 can display a voice input button 370 the selection of which invokes a function for obtaining a voice as an input (e.g., to enable the user to make an input to the system control 320 via a voice input). The system control can display the voice input button 370 in the right lower corner. In response to selection of the voice input button, the user can input voice directly to the smart terminal. The user can then select an information tag 330-360 or the voice input button 370 within system control 320 to trigger a corresponding operating instruction. As an example, system control 320 assists the user in executing the operation. For example, the user clicks the "Camera" information tag 350 to generate an operating instruction to invoke the camera (e.g., the camera application for capturing images), and the operating instruction to invoke the camera is communicated to the smart terminal (e.g., the current system operating system) to invoke (e.g., launch) the camera application and exit from the system control 320. As another example, the user uses the voice input button 370 to enter an input "Tell a joke." In response to obtaining the voice input in connection with the voice input button 370 being selected, system control 320 launches a main page for the smart control 320 and displays or plays an appropriate joke from the main page. For example, in response to the operating system receiving the voice input, the system control launches the main page for the smart control 320 to display the joke. In some embodiments, after an information tag is selected in system control 320, the system control is minimized or exited and the operating instruction corresponding to selection of the information tag is performed.

The system control 320 can recognize the speech signals based on a processing of the speech signals input to a microphone of the terminal. The terminal can obtain the speech signals, and the speech signals can be processed. As an example, processing the speech signals includes processing to filter noise out of the speech signals. As another example, processing the speech signals includes converting the speech signals to text based on a sound-to-text processing. In some embodiments, the system control invokes a process or function to process the speech signals. For example, the process or function can be provided by the operating system and can be called by another application or function. Processing of the speech signals can include processing the text input obtained in connection with performing sound-to-text processing on the text signals. The text input corresponding to the speech signals can be processed to identify one or more keywords. The one or more keywords can be identified based at least in part on a context. For example, the one or more keywords can be identified based on user settings, user preferences, user historical information (e.g., how the user has operated the terminal in the past), an application running, etc. One or more commands can be determined based on the text input. For example, one or more commands can be determined based at least in part on the one or more keywords identified. In some embodiments, the one or more commands comprise launching a main page for the smart control 320 and displaying or playing an appropriate joke from the main page.

In some embodiments, if the current context is a system desktop, the information tag comprises at least one of the following: an entry tag for the recommended application, and an entry tag for a most frequently-used application. As an example, an entry tag corresponds to an icon of an application that the user can click/select to launch the corresponding application. The system control can provide one or more function buttons the selection of which invoke a corresponding operation to be performed. As an example, if the current context is a system desktop application, the function button comprises a voice input button. The system control can provide a threshold number of information tags. The threshold number of information tags provided by the system control can be configurable. The most frequently used applications can be determined by counting the number of times one or more applications (e.g., each application) are used by the user within a period of time. Recommended applications can be based on user need or application type, such as tool applications or communication applications.

In some embodiments, system control 320 comprises an element the selection of which minimizes system control 320. For example, system control 320 can comprise a downward arrow in a top left corner of the system control 320. In response to selection of the element, the smart terminal can minimize the system control or close the system control, and the smart terminal can return to the current context (e.g., continue displaying the application currently running).

Figure 4:
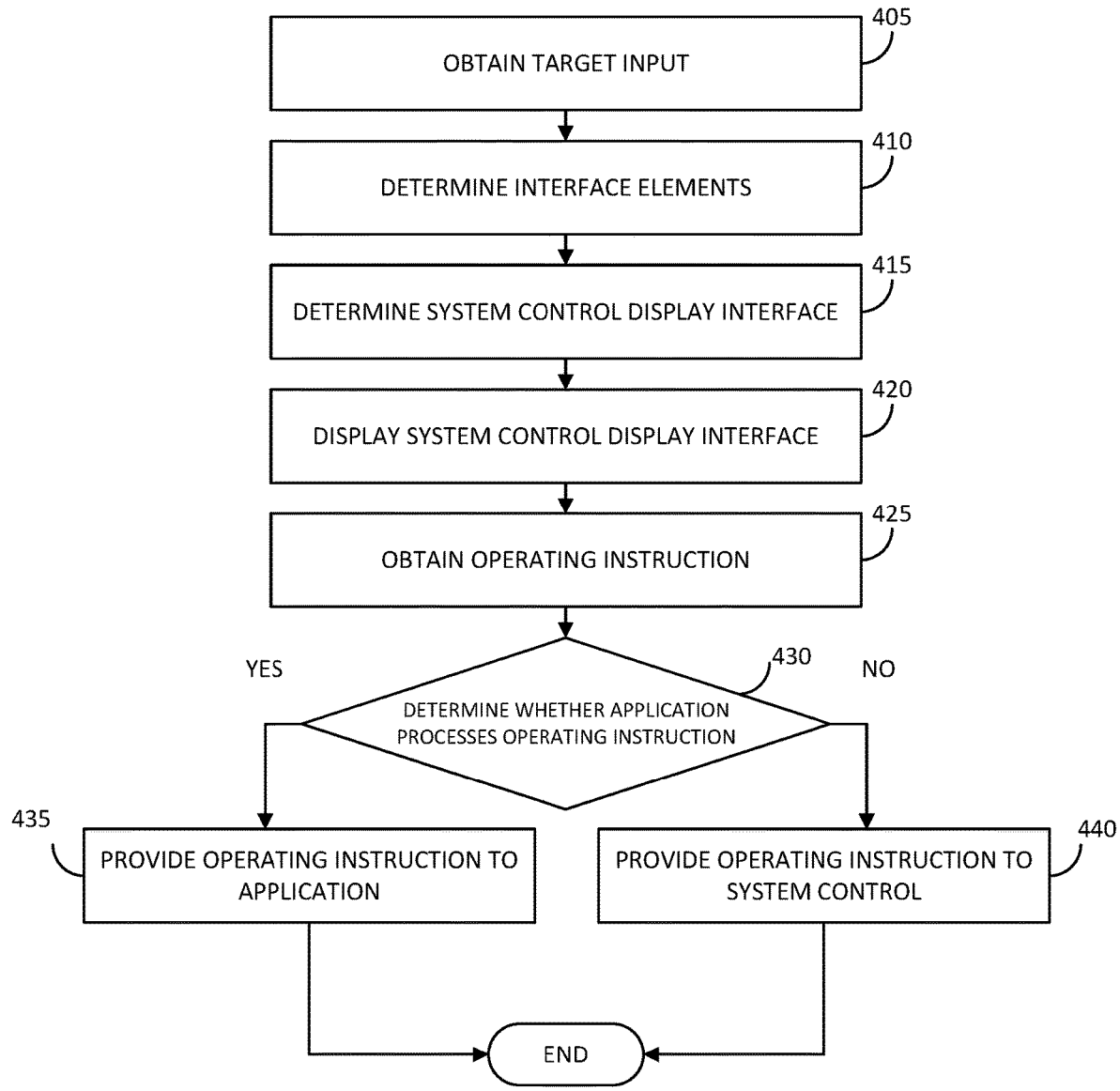
FIG. 4 is a flowchart of a method for processing data according to various embodiments of the present application.

FIG. 4 is a flowchart of a method for processing data according to various embodiments of the present application.

Referring to FIG. 4, process 400 for processing data is provided. Process 400 can be implemented in connection with process 100 of FIG. 1, process 500 of FIG. 5, process 600 of FIG. 6, process 800 of FIG. 8, and/or process 900 of FIG. 9. Process 400 can be implemented in connection with interface 200 of FIG. 2 and/or interface 300 of FIG. 3. Process 400 can be implemented by computer system 1000 of FIG. 10.

At 405, a target input is obtained. The smart terminal can obtain a target input from a user. For example, the user can input an input (e.g., the target input) to a touch screen of the smart terminal. In response to receiving the target input, the smart terminal can determine information corresponding to the target input such as characteristics of the input.

In some embodiments, the target input corresponds to one or more inputs the input of which invokes a system control.

For example, in response to receiving an input, the smart terminal determines whether the input corresponds to a target input. If the input corresponds to a target input, the smart terminal can perform a corresponding function such as invoking (e.g., launching) the system control. A target input can be predefined and stored in a mapping of inputs to target inputs. The smart terminal can query the mapping of inputs to target inputs to determine whether an obtained input has a corresponding target input. If the mapping of inputs to target inputs includes a target input corresponding to the obtained input, the smart terminal determines that the input is a target input (e.g., the system control can be invoked in response to the target input).

In some embodiments, the target input is an active-start input or a passive-start input.

As an example, a passive-start input includes a user passively starting a system control. For example, a passive-start input can correspond to an input which the user uses to cause the system control to be invoked. The passive-start input can correspond to an input that the user intentionally inputs to start the system control.

As an example, an active-start input corresponds to one or more inputs the input of which causes the smart terminal to infer that a user could use assistance with a smart control. For example, the smart terminal could deem the active-start input from a user in a current context to be indicative of a circumstance in which the system control is to be invoked to provide recommendations to the user. As an example, active starting (e.g., an instance when the system control is invoked in response to an active-start input) can occur in a situation according to which the user has not actively started a system control. The smart terminal can infer or determine that other user inputs suggest or are indicative that the user might need to use the system control. In response to the smart terminal inferring or determining that the user might need to use the system control, the system control is started. An example of an active-start input includes at least one sliding input (e.g., a upward sliding gesture). The at least one sliding input (e.g., the upward sliding gesture) can correspond to an upward sliding operation starting at the bottom of the touchscreen with a finger or a stylus. The sliding input can be configurable and can correspond to different directions (e.g., a side slide, an upward slide, a downward slide, etc.) and/or different starting areas (e.g., top of the screen, bottom of the screen, left side of the screen, right side of the screen, over an element being displayed, etc.).

In some embodiments, the smart terminal can provide from the desktop a shortcut icon, a menu option, or a floating action button that corresponds to the system control. Selection of the shortcut icon, menu option, or floating action button that corresponds to the system control can cause the smart terminal to invoke (e.g., launch) the system control.

In some embodiments, the system control is invoked in response to shaking operation. A shaking operation can comprise shaking a smart terminal. The shaking operation can be detected by a sensor built into the smart terminal.

Other predetermined operations which can be used in connection with invoking the system control (e.g., a target input) include a double-tap input, and press-and-hold input. The predetermined operations can be input to a touchscreen of the smart terminal.

Inn some embodiments, a passive-start of the system control is triggered by a particular input (e.g., corresponding to a passive-start input) which configured by the operating system (e.g. an upper sliding gesture), The passive-start input is an input that for which the input is mapped to starting or launching the system control. For example, the input corresponding to the passive-start input is not mapped to any other functions, commands, etc. In some embodiments, input corresponding to the passive-start input does not invoke any other command or function to be performed in response to input of such input. Other gestures or input also can start the system control but these inputs are detected by the system control self, and the system control will start itself actively.

In some embodiments, an active-start input can be mapped to starting or launching the system control in addition to one or more other commands, functions, etc.

An active-start input can be an input that the smart terminal determines to correspond to a query need of the user in the current application. For example, an active-start input can correspond to the same or similar sliding input being received on multiple occasions. The sliding input can be left-to-right, top-to-bottom, or repeated-reversal sliding movements or some other input in the display interface of the current application. The information query that the user is conducting in the current application can be determined through at least one sliding input. For example, the smart terminal can determine (e.g., infer) information that the user is attempting to consume based on information displayed before, during, or after the sliding input.

As an example, in the case of a sliding gesture as an input (e.g., a target input), the smart terminal can obtain touch-screen sliding information corresponding to an input and use the sliding information in connection with determining whether the target input is an upward sliding gesture. The smart terminal can be configured to obtain sliding information from the touchscreen. In some embodiments, a predefined function for obtaining information corresponding to an input (e.g., characteristics of an input such as location, duration, pressure, whether the input was a slide, distance, etc.) can be called. The sliding information includes information such as sliding distance and sliding direction. The smart terminal can determine whether the input corresponds to an upward sliding gesture based at least in part on the sliding information. For example, the smart terminal determines whether the input is an upward sliding gesture based on the sliding distance and sliding direction. A description determining whether an input corresponds to an upward sliding gesture is provided in connection with FIG. 5.

Figure 5:
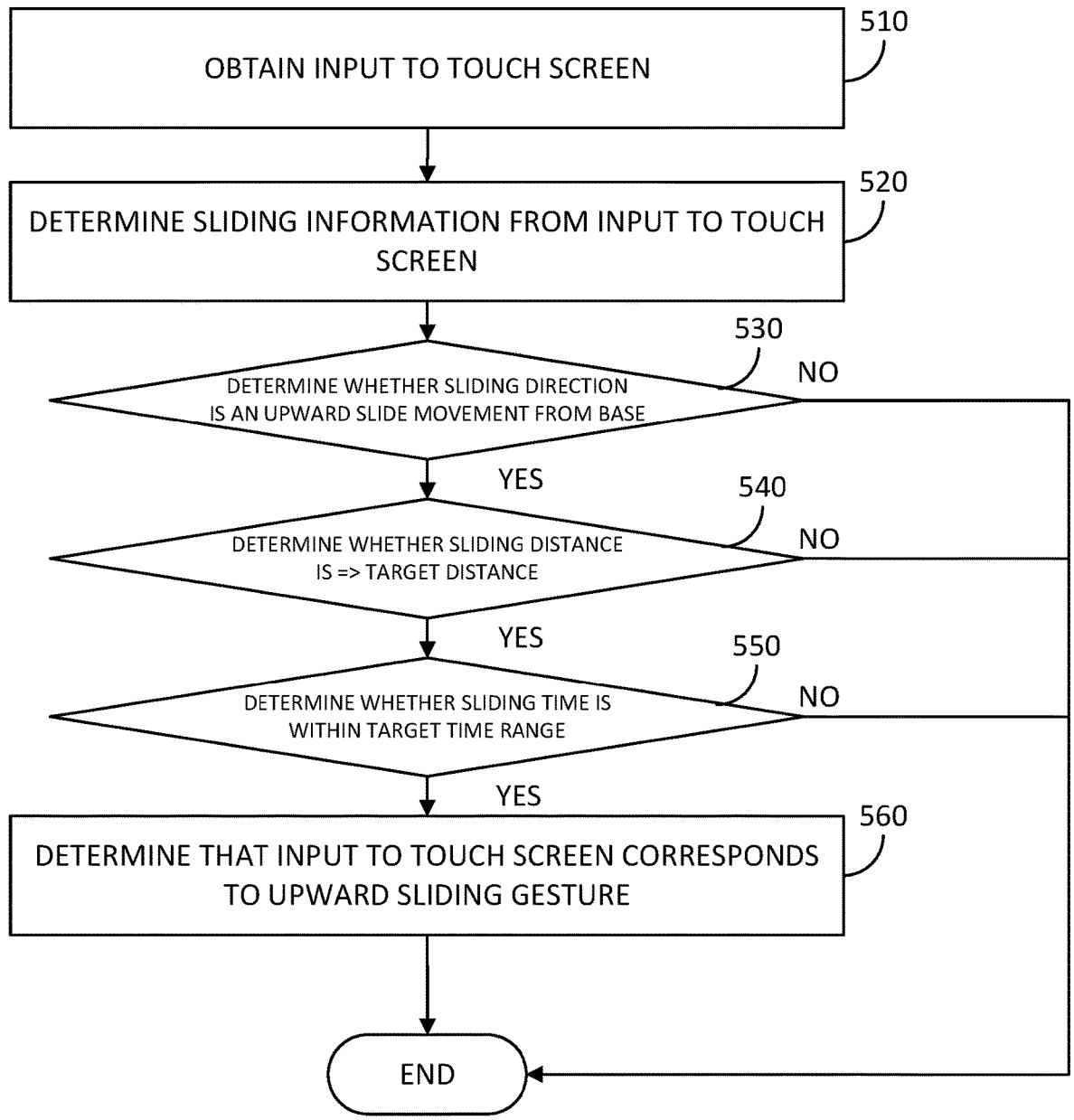
FIG. 5 is a flowchart of a method for receiving an upward sliding gesture according to various embodiments of the present application.

FIG. 5 is a flowchart of a method for receiving an upward sliding gesture according to various embodiments of the present application.

Referring to FIG. 5, process 500 for receiving an upward sliding gesture is provided. Process 500 can be implemented in connection with process 100 of FIG. 1, process 400 of FIG. 4, process 600 of FIG. 6, process 800 of FIG. 8, and/or process 900 of FIG. 9. Process 500 can be implemented in connection with interface 200 of FIG. 2 and/or interface 300 of FIG. 3. Process 500 can be implemented by computer system 1000 of FIG. 10.

At 510, an input to the smart terminal is obtained. For example, the smart terminal can obtain an input to a touch screen of the terminal. The user can interact with the smart terminal to input an input to the touch screen.

At 520, sliding information from the input to the touch screen is determined. The smart terminal can determine sliding information corresponding to the input based on information captured by the touch screen (or the smart terminal) in connection with the input. In some embodiments, a predefined function for obtaining information corresponding to an input (e.g., characteristics of an input such as location, duration, pressure, whether the input was a slide, distance, etc.) can be called. The sliding information includes information such as sliding distance and sliding direction. The sliding information can further include a starting location of the input, an ending location of the input, etc.

At 530, a determination of whether the input corresponds to an upward slide movement from the base is made. The smart terminal can determine whether the input corresponds to an upward slide movement based on the sliding direction. In some embodiments, the smart terminal determines whether the input corresponds to an upward slide movement from the base based on a starting location of the input and a sliding direction of the input. Sliding information can be obtained from an upward sliding operation on a touchscreen to determine the sliding direction of the sliding operation.

In response to determining that the input does not correspond to an upward slide movement from the base at 530, process 500 ends. For example, the smart terminal can determine that the input does not correspond to an upward sliding gesture. In some embodiments, in response to determining that the input does not correspond to an upward slide movement from the base at 530, a command corresponding to the input is performed. For example, a command that is not associated with the system control can be performed. In some embodiments, in response to determining that the input does not correspond to an upward slide movement from the base at 530, the smart terminal provides the input (or information for the input) to the current application, and the current application can function according to the input. For example, the current application can determine whether a function is to be performed in response to the input and/or what function is to be performed.

In response to determining that the input does correspond to an upward slide movement from the base at 530, process 500 proceeds to 540.

At 540, a determination of whether a sliding distance of the input is equal to or greater than a target distance is made. The target distance can be a predefined threshold value. The target distance can be configurable by a user or an administrator. As an example, the sliding information can comprise a sliding distance. As an example, the sliding information can comprise a starting location of the input and an ending location of the input. The smart terminal can determine a sliding distance based at least in part on the starting location of the input and the ending location of the input.

According to various embodiments, in the process of continuously receiving a sliding operation, the sliding distance is calculated from the coordinates at the start of sliding to the coordinates at the current position. A determination of whether the sliding distance of an input is at least the target distance is made.

In response to determining that the sliding distance of the input is less than a target distance at 540, process 500 ends. For example, the smart terminal can determine that the input does not correspond to an upward sliding gesture. In some embodiments, in response to determining that the sliding distance of the input is not equal to or greater than a target distance at 540, a command corresponding to the input is performed. For example, a command that is not associated with the system control can be performed. In some embodiments, in response to determining that the sliding distance of the input is not equal to or greater than a target distance at 540, the smart terminal provides the input (or information for the input) to the current application, and the current application can function according to the input. For example, the current application can determine whether a function is to be performed in response to the input and/or what function is to be performed.

In response to determining that the sliding distance of the input is equal to or greater than a target distance at 540, process 500 proceeds to 550.

At 550, a determination of whether a sliding time is within a target time range is made. The target time range can be a predefined threshold value (or a range of values). The target time range can be configurable by a user or an administrator. The smart terminal can determine whether the sliding time is within the target time range based on the sliding information. As an example, the sliding information comprises a sliding time. As another example, the sliding information comprises information indicating a time at which an input is initiated, and a time at which the input is ended.

If a sliding distance is at least a target distance, the smart terminal further determines the sliding time from the start of sliding to the current position and determines whether the sliding time is within the target time range.

In response to determining that the sliding time is not within the target time range at 550, process 500 ends. For example, if the sliding time is not within the target time range, the smart terminal can determine that the input does not correspond to an upward sliding gesture. In some embodiments, in response to determining that the sliding time is not within the target time range at 550, a command corresponding to the input is performed. For example, a command that is not associated with the system control can be performed. In some embodiments, in response to determining that the sliding time is not within the target time range at 550, the smart terminal provides the input (or information for the input) to the current application, and the current application can function according to the input. For example, the current application can determine whether a function is to be performed in response to the input and/or what function is to be performed.

In response to determining that the sliding time is within the target time range at 550, process 500 proceeds to 560.

At 560, the input to the touch screen is determined to correspond to an upward sliding gesture. The smart terminal determines the input to the touch screen corresponds to an upward sliding gesture. The smart terminal can determine that the input to the touch screen corresponds to a target input. The target input can correspond to an input for the smart control (e.g., rather than an input to the current application).

As an example, the smart terminal is configured such that the target distance is more than ⅓ the height of a predefined position (e.g. the height of a status bar) and the target time range is no more than 500 ms. Thus, if the user begins sliding (e.g., inputs a touch and drag or slide) from the base of the screen, and if the sliding distance of the input is more than ⅓ the status bar height, and the time for that sliding distance is no more than 500 ms, the sliding movement is determined as valid. Determination that the sliding movement is valid can correspond to determination of the input as an upward sliding gesture.

Accuracy for determining whether the user desires to invoke a query or otherwise to invoke the system control can be improved based on detection of multiple consecutive sliding inputs. As an example, in the case of a sliding input, sliding information associated with an input to the touch screen can be obtained and the sliding information can be used as a basis to determine whether the input corresponds to an active-start input. The active-start input can correspond to an input for invoking a smart control or for launching a query. The smart terminal can determine whether the input is a sliding input corresponding to a query request or a need for a query by the user. The sliding information includes information such as sliding distance, sliding direction, sliding time, etc. The sliding information can include other information pertaining to the input such as other characteristics of the input. The smart terminal can determine whether the input corresponds to a sliding input based at least in part on the sliding information. For example, the smart terminal determines whether the input corresponds to a sliding input based on the sliding distance, sliding direction, etc. A description determining whether an input corresponds to a sliding input is provided in connection with FIG. 6.

Figure 6:
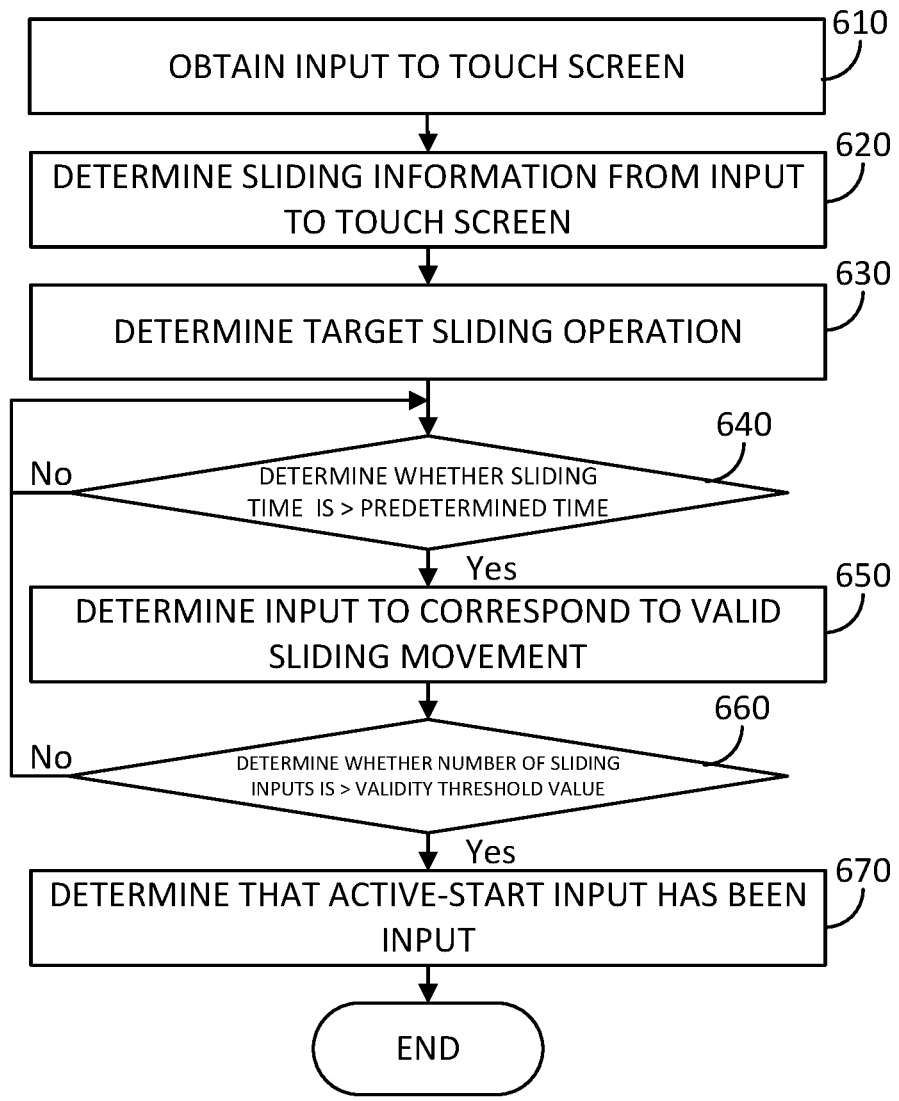
FIG. 6 is a flowchart of a method for determining a sliding input according to various embodiments of the present application.

FIG. 6 is a flowchart of a method for determining a sliding input according to various embodiments of the present application.

Referring to FIG. 6, process 600 for receiving an upward sliding gesture is provided. Process 600 can be implemented in connection with process 100 of FIG. 1, process 400 of FIG. 4, process 500 of FIG. 5, process 800 of FIG. 8, and/or process 900 of FIG. 9. Process 600 can be implemented in connection with interface 200 of FIG. 2 and/or interface 300 of FIG. 3. Process 600 can be implemented by computer system 1000 of FIG. 10.

At 610, an input to the smart terminal is obtained. For example, the smart terminal can obtain an input to a touch screen of the terminal. The user can interact with the smart terminal to input an input to the touch screen.

At 620, sliding information from the input to the touch screen is determined. The smart terminal can determine sliding information corresponding to the input based on information captured by the touch screen (or the smart terminal) in connection with the input. In some embodiments, a predefined function for obtaining information corresponding to an input (e.g., characteristics of an input such as location, duration, pressure, whether the input was a slide, distance, etc.) can be called. The sliding information includes information such as sliding distance and sliding direction. The sliding information can further include a starting location of the input, an ending location of the input, etc.

At 630, a target sliding operation is determined. The target sliding operation can correspond to an active input. The target sliding operation is determined based at least in part on the sliding direction of the input. The smart terminal can obtain the sliding direction from the sliding information corresponding to the input, and the smart terminal can determine the target sliding operation.

At 640, a determination of whether a sliding time of the target sliding operation is greater than a predetermined time is made. The predetermined time can correspond to a predefined threshold value. The predetermined time can be configurable by a user or an administrator. As an example, the smart terminal can determine a sliding time based at least in part on a time at which the user touches the touch screen in connection with the input and a time at which the user releases the touch from the touch screen. As another example, the smart terminal can determine a sliding time based at least in part on a time at which the user initiates moving the touch of the input to the touch screen and a time at which the user stops moving the touch of the input. The sliding time can correspond to the length of time from a time at which the user touches the touch screen to a time at which the user releases the touch from the touch screen.

According to various embodiments, sliding information is obtained from the sliding operation on the touchscreen. The sliding information can comprise the sliding direction and sliding distance determined according to all the coordinates of the slide path of the sliding operation. The current sliding operation is regarded as a target sliding movement according to the sliding direction. For example, an upward sliding operation or downward sliding operation in a contact directory application can be deemed as a target sliding operation. A leftward sliding operation or rightward sliding operation on a system desktop can be deemed as a target sliding operation.

In addition to determining the sliding distance and direction based on the sliding information, the sliding time corresponding to the input (e.g., the sliding operation) can be determined. The sliding time can correspond to the time from the start of sliding to a time at which the touch arrives at the current position.

In response to determining the sliding time of the target sliding operation is not greater than the predetermined time at 640, process 600 proceeds to continue to assess the sliding time of the corresponding input. In some embodiments, in response to determining the sliding time of the target sliding operation is not greater than the predetermined time, process 600 ends. For example, if the input has stopped (e.g., if the user releases a corresponding touch input to the touch screen) and the input had a sliding time that is less than the predetermined time, process 600 can be stopped with respect to the input.

In response to determining that the sliding time of the target sliding operation is greater than the predetermined time at 640, process 600 proceeds to 650 at which the input is determined to correspond to a valid sliding movement. In response to determining that the sliding time of the target sliding operation is greater than the predetermined time, the smart terminal can store the input as a valid sliding movement. To store the input as a valid sliding movement can comprise deeming the input as a sliding input.

At 660, a determination of whether a number of sliding inputs is greater than a validity threshold value is made. The smart terminal can determine whether a number of sliding inputs within a threshold time period is greater than the validity threshold value. The validity threshold value can be a predefined threshold value. In some embodiments, the validity threshold value is configurable by a user or an administrator. The validity threshold value can be set according to historical information (e.g., historical information of a manner in which the user operates a smart terminal). The threshold time period can be configurable by a user or an administrator, or can be set by the smart terminal according to user preferences or settings, or user historical information. The determining of whether the number of sliding inputs is greater than the validity threshold value can include determining whether a number of inputs that are deemed to be sliding inputs is greater than the validity threshold value.

According to various embodiments, in connection with determining a user query need, if the user is determined to be failing to find needed or desired information on multiple occasions, then a system control is employed to provide assistance and increase querying efficiency. For example, if the user uses an input (e.g., the sliding operation) continually (e.g., a predefined number of times within a threshold period of time), the terminal can deem such multiple or continuous inputs to correspond to the user not being able to find what the user wants, and the terminal can invoke the system control. If the user finds the needed information on the first query attempt (or less than a validity threshold value), then the system control is not employed to provide assistance. An example in connection with determining a user query need is if the user is determined to be failing to find needed or desired information on multiple occasions using the application that is being displayed or that is running. An example in connection with determining a user query need is if the user is determined to be failing to find needed or desired information on multiple occasions within a predefined period of time.

In some embodiments, a target sliding operation configuration includes a number of attempts. The number of attempts at a start time is set at 0, and for each sliding input that is detected, a number of sliding inputs (e.g., sliding input attempts) is incremented by 1. The smart terminal determines whether the number of attempts corresponding to sliding inputs of the target sliding operation is greater than a validity threshold value. The smart terminal can determine whether the number of attempts corresponding to sliding inputs of the target sliding operation is greater than a validity threshold value periodically, continuously, or in connection with each input being determined to be a sliding input.

In response to determining that the number of sliding inputs (e.g., the number of attempts corresponding to sliding inputs) is not greater than the validity threshold value at 660, process 600 proceeds to 640. In some embodiments, in response to determining that the number of sliding inputs (e.g., the number of attempts corresponding to sliding inputs) is not greater than the validity threshold value, process 600 can end. For example, if the input has stopped (e.g., if the user releases a corresponding touch input to the touch screen) and the number of sliding inputs is not greater than the validity threshold value, process 600 can be stopped with respect to the input or with respect to determining whether to invoke a system control for the input or that series of inputs.

In response to determining that the number of sliding inputs (e.g., the number of attempts corresponding to sliding inputs) is greater than the validity threshold value at 660, process 600 proceeds to 670.

At 670, an active-start input is determined to have been input. The determining that the active-start input has been input can include determining that the active-start input has been invoked based on an input or a series of inputs (e.g., which correspond to sliding inputs). In some embodiments, the determining of whether the active-start input is input can be used in connection with determining whether the system control is invoked (e.g., based on the smart terminal inferring that the user can be assisted by the system control).

In some embodiments, if the number of attempts corresponding to sliding inputs of the target sliding operation is greater than a validity threshold value, then the user is confirmed as having a query need and as having failed to find the needed or desired information. In response to the confirmation of the user as having a query need, the multiple attempts of the target sliding operation are regarded as active-start input. In some embodiments, the system control is invoked (e.g., displayed) after determining that more than one sliding input has been received.

In some embodiments, the smart terminal is configured in a manner to add a piece of gesture-assessment code for user touchscreen operations to the operating system (e.g., to the PhoneWindow.java file of the YUNOS system). The piece of gesture-assessment code for user touchscreen operations can be added to configure the smart terminal to determine sliding movements that start at the screen bottom (or at a predefined location). In some embodiments, a system control such as a personal assistant control is invoked via a process such as startService when one or more predefined conditions are met. The personal assistant control (e.g., the system user assistance control or system control) can assist the user in executing various operations, such as voice input and instruction input operations.

According to various embodiments, PhoneWindow is the parent of all views on the smart terminal. For example, the PhoneWindow is the parent view on the smart terminal. Other views of the smart terminal can be children to Phone-Window. As an example, screen touch operations (e.g., touch events or touch inputs) are first conveyed to the parent view and then to sub-views of the parent view. In some embodiments, all touch inputs are first conveyed to the parent view and thereafter to sub-views of the parent view. Accordingly, gesture operations input by the user can be intercepted at the parent view, thereby enabling the personal assistant control to be invoked in any context or any predefined context. For example, at the parent view, if a predefined gesture operation is obtained, the system control can be invoked. The system control (e.g., personal assistant control) is thus systematized (e.g., is part of the operating system and not an application) via implementation of the system control using interception at the parent view or at the parent control.

Returning to FIG. 4, at 410, interface elements are determined. In some embodiments, the smart terminal determines the interface elements based on a current context of the smart terminal. The current context can be determined based on one or more applications currently running on the application, an application currently being presented by the smart terminal, information being presented by the smart terminal (e.g., within an application), a menu or a page being presented by the smart terminal, etc. In some embodiments, the current context is determined based at least in part on an input from one or more sensors such as a sensor indicating a movement, a location, etc. of the smart terminal. The interface elements can be determined based on a mapping of interface elements to contexts. The mapping of interface elements can comprise a mapping of types of interface elements to types of contexts. As an example, the interface elements can be determined in connection with querying the mapping of interface elements to contexts. In some embodiments, a threshold number of interface elements is determined. The threshold number of interface elements to be determined can be configurable. For example, the threshold number of interface elements can be configured according to one or more of user preferences, user settings, historical information, a current context, etc. Historical information can include historical information associated with the operation of a smart terminal such as historical information of the user's operation of the smart terminal, a user's call history, a user's communication history, a user's browsing history, etc.

At 415, a system control display interface is determined. In some embodiments, the system control display interface is determined based at least in part on the interface elements. For example, the system control display interface corresponding to a system control (e.g., for the current context) is customized based on the interface elements. The determining of the system control display interface can include determining a number of interface elements to include on the system control display interface. If a number of interface elements that are determined exceeds a number of interface elements to include on the system control display interface, the smart terminal can select the subset of interface elements of the interface elements that were determined, and include the subset of interface elements on the system control display interface. In some embodiments, the system control display interface includes a predefined number of interface elements. In some embodiments, the system control display interface includes a maximum number of interface elements. The predefined number of interface elements or the maximum number of interface elements can be configurable according to user preferences, user settings, user input, historical information, a ranking of relevance of the interface element to the current context, etc. The determining of the system control display interface can include determining an arrangement of the interface elements (or the selected interface elements to be included on the system control display interface) on the system control display interface. The arrangement of the interface elements can be based on user preferences, user settings, user input, historical information, a ranking of relevance of the interface element to the current context, etc. The determining of the system control display interface can include populating a system control display interface template with information. As an example, the information populated in the system control display interface template can include information associated with the current context (e.g., the current application), the interface elements, etc.

At 420, the system control display interface is provided. In some embodiments, the smart terminal displays the system control display interface (e.g., corresponding to the system control for the current context) to a user. The displaying of the system control interface can include displaying the system control interface as an overlay to a current application. For example, the displaying of the system control interface can include invoking a floating window with the application interface of the current application as a background and displaying the system control interface in the floating window.

In some embodiments, the determining of the interface elements associated with the current context comprises: obtaining interface information or an application package name of the current application, and determining the interface elements based at least in part on the application package name or interface information. For example, the application package name or interface information can be used as a basis to determine at least one of the following interface elements: an information tag, a function button, etc.

In some embodiments, the determining of the interface elements associated with the current context comprises: obtaining interface information or an application package type of the current app, and determining the interface elements based at least in part on the application package type or interface information. For example, the application package type or interface information can be used as a basis to determine at least one of the following interface elements: an information tag, a function button, etc.

In some embodiments, determining the current context comprises determining information associated with the current application. The information associated with the current application can include one or more of an application name, an application type, an application developer, one or more functions provided by the application, etc.

In some embodiments, the determining of the interface elements associated with the current context includes determining whether (or which) interface elements are to be selectable. An interface element that is selectable can correspond to an element that invokes an operation in response to input to (or selection of) the element by a user, etc.

In some embodiments, when a smart terminal receives a target input, the current context corresponds to the context of the application currently in use. In some embodiments, when a smart terminal receives a target input, the current context corresponds to the context of the system desktop. The interface elements displayed in the system control are associated with the current context. Therefore, when an application is running, the smart terminal obtains the application package name, and, when the current location is a system interface such as the system desktop, the smart terminal acquires interface information, such as "located in main interface" or an application display interface. The smart terminal determines the interface elements based on the application package name or interface information. In some embodiments, the interface elements comprise information tags and/or function buttons.

The information tags can correspond to recommended tag information. As an example, the information tags are configured based on historical use data corresponding to the current context. For example, the information tags can include application function entry points (e.g., an information tag such as 730-760 of FIG. 7) or recommended options (e.g., an information tag such as 730-760 of FIG. 7). In some embodiments, an information tag executes an appropriate function or launches another application or sends information to another application. A function button can be related or unrelated to the current context. For example, function buttons include voice input buttons, camera buttons, and power-off buttons.

As an example, in the case of the current context being a photo album application, the information tag can include at least one of the following: a screenshot tag, a recent photo tag, a specific ranking tag, and a marked tag. As another example, in the case of the current context being a photo album, the function button can include a voice input button. A screenshot tag can include snapshots of all the display content of captured screens. A recent photo tag can include the photos taken in the most recent time interval, such as one month. The most recent time interval can be predefined and/or configurable. A specific ranking tag can include rankings according to time, content, etc. A marked photo can include photos marked by the user in advance (e.g., marked as liked, as a favorite, according to a predefined classification, etc.)

In some embodiments, a system control display interface is customized according to interface elements. For example, interface elements associated with the current context are displayed in the display interface of the system control. The system control display interface can include one or more general display elements. After the system control display interface is determined (e.g., customized, populated, etc.), a floating window is invoked. The current context (e.g., an application currently running) serves as the background to the floating window. If the current context is a system desktop, then the floating window is displayed with the system desktop as the background. If the current context is an application, a floating window starts with the application interface of the current application as the background, and the display interface of the system control is displayed in the floating window.

In some embodiments, the base level of a system control, such as a personal assistant control, is implemented as a service. For example, the system control can be started using startService. When the system control starts, the system control first acquires the package name of the current application ("activity"). Then the system control creates a display interface depending on the package name in order to display a customized system control.

Figure 7:
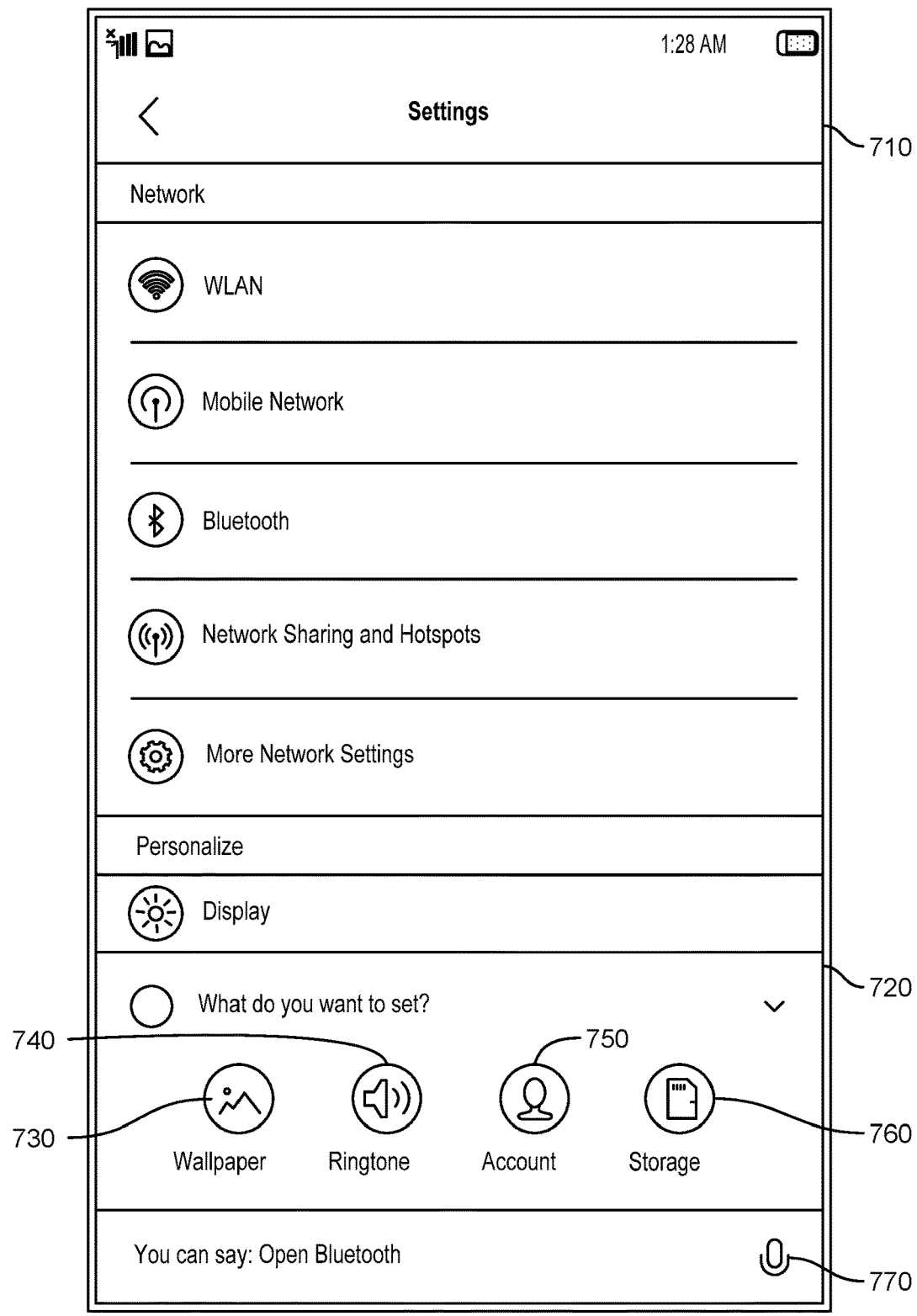
FIG. 7 is a diagram of an interface according to various embodiments of the present application.

FIG. 7 is a diagram of an interface according to various embodiments of the present application.

Referring to FIG. 7, interface 700 is provided. Interface 700 can be implemented in connection with process 100 of FIG. 1, process 400 of FIG. 4, process 500 of FIG. 5, process 600 of FIG. 6, process 800 of FIG. 8, and/or process 900 of FIG. 9. Interface 700 can be implemented in connection with interface 200 of FIG. 2 and/or interface 300 of FIG. 3. Interface 700 can be implemented by computer system 1000 of FIG. 10.

As illustrated in FIG. 7, interface 700 includes a system control (e.g., a personal assistant system control) 720 in connection with a current application 710. Current application 710 can correspond to an application for system settings. For example, system control 720 is invoked in response to a target input being input in current application 710 (e.g., while the smart terminal displays the system settings). The display interface of the system control 720 displays the information tags 730-760. The system control 720 can provide the information tags as a recommendation for the user. For example, in response to the target input in the contact directory application, the system control is invoked and recommends information tags 730-760. Information tags 730-760 can correspond to interface elements determined for the system control display interface of system control 720. In some embodiments, system control 720 displays a voice input button 770 the selection of which invokes a function for obtaining a voice input as an input (e.g., to enable the user to make an input to the system control 720 via a voice input). The system control can display the voice input button 770 in the right lower corner. In response to selection of the voice input button, the user can input voice directly to the smart terminal. The information tags 730-760 can be selectable elements such that selection of one of the information tags 730-760 causes the smart terminal to perform a corresponding operation. The user can then select an information tag (e.g., 730, 740, 750, and 760) or the voice input button 770 within the system control 720 to trigger a corresponding operating instruction. The system control 720 assists the user in executing the operation.

If the current context (if current application 710) is system settings, the information tag comprises at least one of the following: entry tag for recommended settings and entry tag for most frequently-changed settings. The function button can include a voice input button 770. The system settings can be regarded as a type of system application. Recommended settings, such as Bluetooth, WiFi, and other data connection settings, can be based on user need. The most frequently changed settings can be the settings which, according to statistics for a period of time (e.g., historical information corresponding to an operation of the smart terminal over a predefined period of time), are settings that the user has often changed. In connection with adjusting a system setting, a user issues a target input with an upward sliding gesture. The interface elements associated with the system settings are determined at this time (e.g., in response to detecting the upward sliding gesture, after the input has been determined to be an upward sliding gesture, etc.). For example, some functions in the system settings can include information tags, including "Wallpaper," "Ring," and "Accounts." A voice input button is also set up for receiving voice input.

As illustrated in FIG. 7, the information tags included in system control 720 can include a wallpaper information tag 730, a ring settings information tag 740, an accounts information tag 750, and a storage information tag 760.

Returning to FIG. 4, at 425, an operating instruction is obtained. The smart terminal can obtain the operating instruction in connection with a user inputting an input to the touch screen of the smart terminal. In some embodiments, the operating instruction corresponds to an input to the system control. For example, the operating instruction can be determined based on a user triggering an interface element in the system control. In response to a user selecting an interface element of the system control, the operating instruction can be generated or determined.

An operation is received and executed through the appropriate operating instruction provided as feedback by the system control. For example, the user can trigger an interface element in the system control, and the operating instruction corresponding to the interface element is obtained. For example, if the triggered information tag is a function entry point for an application, then triggering (e.g., selection) of the information tag causes an operating instruction to start an application to be generated. As another example, if the triggered information tag is a recommendation option associated with the current application, then triggering (e.g., selection) of the information tag causes an operating instruction that is forwarded to the current application to be generated. As yet another example, if the triggered function button is a voice input button, triggering (e.g., selection) of the information tag causes an operating instruction to be generated based on a voice input that is input in connection with the triggering of the voice input button.

In some embodiments, the smart terminal obtains speech signals based on triggering the voice input button. The smart terminal recognizes the speech signals and generates an operating instruction based on recognized text data. For example, the smart terminal performs a speech to text processing and determines the operating instruction based at least in part on the text corresponding to the speech signals.

The user can trigger (e.g., select) the voice input button to record speech signals. The system control receives the corresponding speech signals based on the triggering of the voice input button. In connection with the receiving of the corresponding signals, the speech signals are recognized. For example, speech signals are subject to operations such as feature extraction and matching in order to recognize the corresponding text data. An operating instruction, such as an instruction to look up information or an instruction to enter an application, is generated based on the text data determined based at least in part on the speech signals.

In response to obtaining the operating instruction, the processing entity for the operating instruction is analyzed, and the operating instruction is issued to the processing entity for processing. For example, the smart terminal determines the processing entity that is to process the operating instruction. The processing entity can include the current application and/or the system control. In some embodiments, the analysis of each operating instruction is processed by the current application or by the system control itself. In some embodiments, the processing entity can include another application that is different from the current application.

At 430, a determination of whether the current application processes the operating instruction is made. For example, the smart terminal can determine whether the current application is configured or capable of processing the operating instruction. As another example, the smart terminal can determine whether the operating instruction is associated with information or functions provided by the current application.

The smart terminal determines whether the current application can process the operating instruction (e.g., whether the operating instruction is an instruction relating to the current application). As illustrated in FIG. 2, the current application is a contact directory. In response to the user clicks on the information tag "Zhang San" 240, the smart terminal (e.g., the system control) determines whether an operating instruction associated with selection of the information tag 240 is a current application instruction (e.g., an instruction to be processed by the current application). Conversely, if, using the voice input button 250, the user provides "take a picture" as voice input, the smart terminal determines that the operating instruction corresponding to the voice input is not an operating instruction for the current application.

In response to determining that the application processes the operating instruction at 430, process 400 proceeds to 435 at which the operating instruction is provided to the application (e.g., the current application). In response to determining that the application does not process the operating instruction at 430, process 400 proceeds to 440 at which the operating instruction is provided to the system control.

If the current application can process the operating instruction, then the current application is regarded as the processing entity, the operating instruction is forwarded to the current application, and the system control is exited. The current application executes the operating instruction (e.g., displays the contact information for "Zhang San" or directly telephones "Zhang San," as shown in FIG. 2).

In some embodiments, the operating instruction is included in the query message of the current context. A corresponding query message can be generated through the system control in order to assist the user in executing a look-up operation. For example, the user can trigger an interface element in the system control, and the interface element serves as a basis for receiving the corresponding query data, such as keywords, and generating a corresponding query message. For example, if the triggered information tag is a recommendation tag for a function entry point of an application, then a query message is generated for looking up this function entry point. As another example, if the triggered information tag is a recommendation tag for a query keyword in the current application, then the query keyword corresponding to the tag is acquired and a query message including the query keyword is generated. In another example, if the triggered function button is a voice input button, then recorded speech signals are received, and query data for generating the query message is determined based on the speech signals.

In some embodiments, the information tags comprise query tags and recommendation tags for function entry points. The function buttons can include voice input buttons, camera buttons, etc. The function buttons can be associated with (e.g., correspond to) the information tags. Various information tags and function buttons can be used in connection with generating query messages in different manners to assist the user with performing the query. If the information tag is a query tag, the generating of a query message based on triggering the interface element comprises: receiving a query keyword based on triggering the query tag and using the query keyword to generate a query message.

The query tag can provide the user with a query keyword. For example, information about a frequent contact or a contact group is displayed in a contact directory application context. Thus, by clicking a query tag, the user triggers a look-up of the corresponding query keyword. The query keyword corresponding to the query tag is received based on triggering the query tag, and the query keyword is used to generate a query message. A query recommendation can thus be provided for the user to assist the user with the query. The query message can be provided to the applicable processing entity. In response to receiving the query message, the processing entity processes the query corresponding to the query message.

If the function button is a voice input button, the generating of a query message based on triggering the interface element comprises: receiving speech signals based on triggering the voice input button, recognizing the speech signals, determining query keywords (e.g., based on the speech signals), and using the query keywords to generate a query message. The user can trigger the voice input button to record speech signals. The system control receives the corresponding speech signals based on triggering the voice input button. In response to obtaining the speech signals, the speech signals are recognized. For example, speech signals are subject to operations such as feature extraction and matching in connection with determining the corresponding text data. Query keywords are determined based on the text data, and the query keywords are used in connection with generating a query message. The query message can be provided to the applicable processing entity. In response to receiving the query message, the processing entity processes the query corresponding to the query message.

If the information tag is a recommendation tag for a function entry point, the generating of a query message based on triggering the interface element comprises: receiving application information through triggering the information tag, and using the application information to generate a query message. In some application contexts, the user can look up and enter an application or look up some functions provided by an application. For example, the information tag can be a recommendation tag for a function entry point. As in the system settings in FIG. 7, each setting option may correspond to a recommendation tag. By clicking on the corresponding recommendation tag, the user can look up and enter the function. The application information corresponding to the function entry point is received by triggering the information tag (e.g., recommendation tag). The application information is used to generate a query message.

In response to the query message being determined (e.g., generated), the processing entity to process the query message can be determined based on the current application context. The processing entity can include the current application or the system control itself. For example, the analysis of each query message is executed by the current application or is processed by the current system desktop or system setting. As another example, the system control directly executes the query.

In some embodiments, the processing of the query message through the system control comprises: forwarding the query message to the processing entity of the current context, the processing entity of the current context obtaining a query keyword from the query message, and performing a query based on the query keyword and displaying corresponding query results. The query can be performed against information associated with the processing entity. For example, the information associated with the processing entity can correspond to a database, a table, or the like that the processing entity accesses or manages in connection with providing information (e.g., to the user). The processing entity for the current context can be the current application, the system desktop, etc.

As an example, in the case of the current context being a contact directory application, a photo album application, or some other such application, the user generally looks up information in the current application. Therefore, the system control sends the query message to the current application, and the current application obtains a query keyword from the query message. The current application looks up the information (e.g., processes the query corresponding to the query message) based on the query keyword. For example, the current application looks up contact information, chat records, photos, etc., and provides (e.g., displays) the query results.

The smart terminal can determine whether the current application is capable of processing the query message. For example, the smart terminal can determine whether the query message is a query directed at the current application. If the current application is to process the operating instruction, then the query message is issued to the current application, and the system control exits. The current application executes the operating instruction (e.g., processes the query). If the current application cannot process the query message, the system control can execute the query message to look up corresponding information. For example, in the case of a query message generated from triggering a recommendation tag for a function entry point, the system control launches or invokes the application or application function corresponding to the function entry point.

In some embodiments, the processing of the query message through the system control comprises: determining a target application corresponding to application information in the query message through the system control, switching to (e.g., displaying) the target application, and exiting the system control.

As an example, in the case of the current query message including application information, the application information in the query message can be used in connection with starting a certain application or in connection with entering a certain function in an application. The system control can determine a target application corresponding to the application information, switch to the target application, and exit the system control.

For example, the system control can start its own main web page, which displays various kinds of assistance function information that can be provided to the user. Then the system control is exited, and the main web page provides the user with assistance. As another example, a query message generated by triggering a recommendation tag corresponding to a function entry point generally includes application information. Therefore, the target application corresponding to the application information is determined. The next steps are to go to the target application and exit the system control. The target application executes the query content corresponding to the query message.

In some embodiments, the system control (e.g., the system-level assistant control) automatically detects user query needs and starts queries in various query contexts. The system control display interface can be customized according to query context. Consequently, if the user is determined to need or desire help in a query context, the system control proactively starts helping the user to complete the query operation. As a system-level control, the personal assistant can interact with applications at a deep level.

According to various embodiments, if the current application cannot process the operating instruction (or if the smart terminal determines that the current application is not to process the operating instruction), the system control serves as the processing entity, and the operating instruction is issued to the system control for processing. The system control then analyzes the operating instruction, determines the operation specifically required by the operating instruction, and thus determines the actual processing operation.

In some embodiments, in response to the system control obtaining the operation instruction, the system control switches to the main page corresponding to the system control to process the operating instruction and exit the system control. As an example, if the system control is exited, the system control is reverted to running in the background. For example, when the system control is running in the background, the system control is not displayed and can correspond to a background process of the operating system. The system control can start a main page for the system control. The main page for the system control can be a web page. The main page for the system control can display various kinds of assistance function information that can be provided to the user. Then the system control is exited, and the main web page provides the user with assistance.

In some embodiments, the system control determines a target application corresponding to the operating instruction, launches (or switches to) the target application, and the system control is exited. As an example, in the case of an information tag such as an application entry point, the system control determines that the operating instruction is to go to (e.g., launch or switch to) another application. The system control determines the target application corresponding to the operating instruction. Thereafter, the system control launches or switches to the target application, and the system control is exited. The target application corresponding to the operating instruction is provided with the operating instruction (or an indication to perform the operating instruction). The target application executes the operating instruction.

Figure 8:
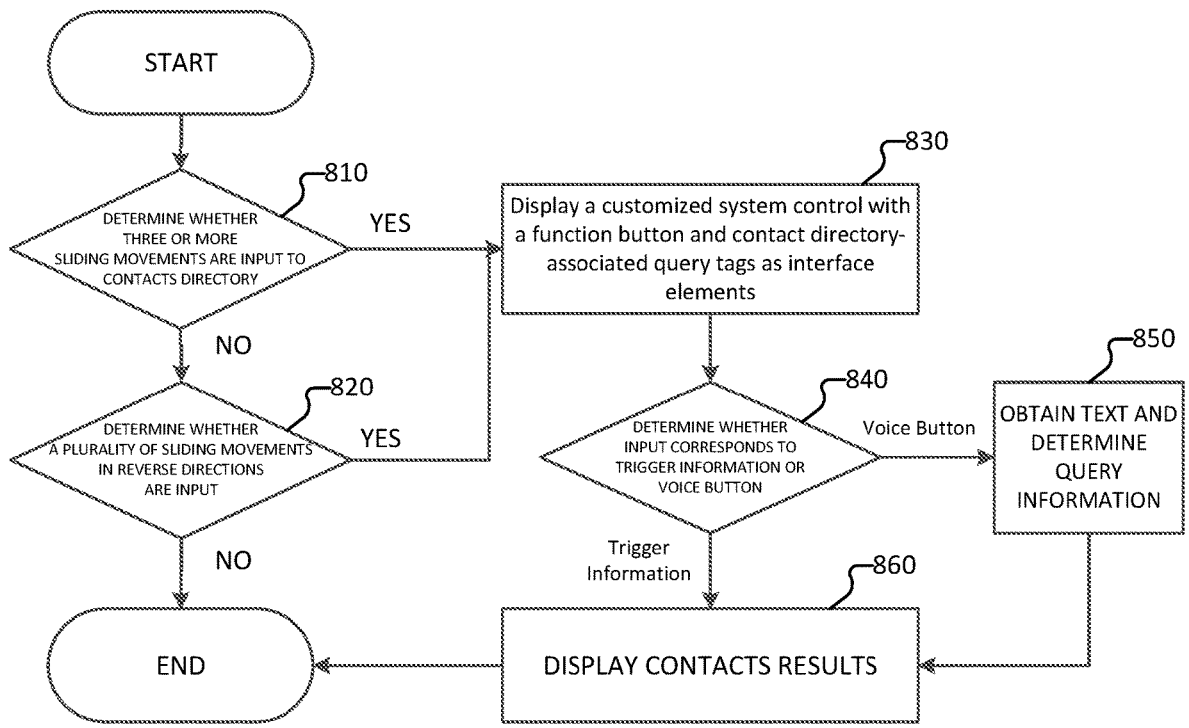
FIG. 8 is a diagram of an assistant control-assisted operation according to various embodiments of the present application.

FIG. 8 is a diagram of an assistant control-assisted operation according to various embodiments of the present application.

Referring to FIG. 1, process 800 for processing data is provided. Process 800 can be implemented in connection with process 100 of FIG. 1, process 400 of FIG. 4, process 500 of FIG. 5, process 600 of FIG. 6, and/or process 900 of FIG. 9. Process 800 can implement interface 200 of FIG. 2, interface 300 of FIG. 3, and/or interface 700 of FIG. 7. Process 800 can be implemented by computer system 1000 of FIG. 10.

Process 800 provides an example of a system control being used in connection with a contacts directory application.

As an example, in the context of a contacts directory application, a user can look up a contact by scrolling up or down in the contact directory. However, searching for a particular contact in the contacts directory by scrolling can be difficult and inefficient if the contacts directory includes a relatively large number of contacts. In some cases, a contact can be located in a contacts directory based on selection of the first letter of the surname. However, the presentation of surname initials in contacts directory applications is generally quite small. For example, the font of the surname initials or the display area for the surname initials can be small and difficult to read (interpret) or select. Accordingly, users might very easily select the wrong surname and then have to select another surname corresponding to the originally intended surname. In such cases, users submit additional inputs to obtain the intended information. To take the example of searching by scrolling, if a user inputs a sliding movement three or more times rapidly in succession, or when repeated sliding direction reversals are detected (e.g., searching by scrolling upward and then downward), the determination can be made that the user has a query need (e.g., the smart terminal can infer that the user has a query need). A customized system control can be displayed using a function button and query tags associated with the contact directory as interface elements. For example, in response to inferring that the user has a query need based on the inputs that the user made in relation to the contacts directory application, the smart terminal can invoke a system control to assist the user with the query. In the example of the current context being a contact directory application, the information tag can comprise at least one of the following: frequently-used contact tag, recently-called contact tag, and contact group tag. The function button can include a voice input button. Frequently-used contacts can comprise contacts in regular communication. Recently-called contacts can comprise contacts who communicated within the most recent time interval, such as one day. A contact group can comprise a preconfigured contact group, such as friends, family, or co-workers.

As illustrated in FIG. 2, a system control (e.g., a personal assistant system control) is started in response to a target input in the contact directory application. The user can select an information tag or the voice input button within this system control to trigger a corresponding operating instruction. The system control assists the user in executing the operation. For example, by clicking the "Li Si" information tag, the user can generate a query message to trigger "Li Si" and the system control provides the query message to the contact directory application for looking up and presenting the contact information of "Li Si" or for directly telephoning "Li Si." As another example, by using the voice input button, the user records a voice input of "telephone Zhang San." After recognizing the corresponding speech signals, the system control provides the speech signals (e.g., or generates a corresponding query message and sends the query message) to the contact directory application, which looks up and dials the telephone number for "Zhang San."

In response to consecutive sliding movements or repeated reversals occurring on the contact list page, the smart terminal (e.g., the system control) determines that the user is searching unsuccessfully for a certain contact and proactively presents a display interface of a personal assistant (e.g., the system control). Moreover, the system control recommends the contacts which the user most likely is searching for. The user can click an interface element corresponding to a frequently used title or a speech session for help in finding the desired contact.

Referring back to FIG. 8, process 800 can be invoked in response to obtaining an input to the smart terminal. For example, process 800 can be invoked in response to obtaining an input to a contacts directory application on the smart terminal.

At 810, the smart terminal determines whether a predefined number (e.g., three) of predefined inputs (e.g., sliding movements) is input to the contacts directory application.

In response to determining that a predefined number of predefined inputs have not been input to the contacts directory application at 810, process 800 proceeds to 820. In response to determining that a predefined number of predefined inputs have been input to the contacts directory application at 810, process 800 proceeds to 830.

At 820, the smart terminal determines whether a plurality of predefined movements (e.g., sliding movements) in reverse directions are input. For example, the smart terminal determines whether the user sequentially inputs an upward gesture and a downward gesture. For example, if the user uses an input (e.g., the sliding operation) continually (e.g., a predefined number of times within a threshold period of time), the terminal can deem such multiple or continuous inputs to correspond to the user not being able to find what the user wants, and the terminal can invoke the system control.

If the smart terminal determines that a plurality of predefined movements in reverse directions are not input at 820, process 800 can end.

If the smart terminal determines that a plurality of predefined movements in reverse directions are input at 820, process 800 proceeds to 830.

At 830, the smart terminal displays a customized system control. The system control can include a function button and one or more interface elements. The one or more interface elements can be associated with the contacts directory application. For example, the one or more interface elements can be contacts-directory associated query tags.

At 840, the smart terminal determines whether an input to the system control corresponds to trigger information or a voice input button. For example, the smart terminal determines whether an input to the system control is a selection of an interface element such as an information tag, or is a selection of a voice input button.

If the smart terminal determines that the input to the system control is a selection of the voice input button at 840, process 800 proceeds to 850. At 850, the smart terminal obtains text and determines query information. For example, in connection with selection of the voice input button, the smart terminal can record a voice input. The voice input is processed and text corresponding to the voice input is obtained (e.g., using speech-to-text processing). The system control determines query information based on the text obtained from the voice input. Process 800 can then proceed to 860.

If the smart terminal determines that the input to the system control is trigger information at 840, process 800 proceeds to 860. The smart terminal can determine that the input to the system control is trigger information in the case of an input to the system control is a selection of an interface element such as an information tag. The system control can generate a query message (e.g., query information) based on the selection of an interface element such as an information tag. The system control can provide the query message to the display contacts application.

At 860, contacts results are displayed. The contacts directory application can obtain the query message from the system control and perform the corresponding query. The results of the query are provided to the user.

Figure 9:
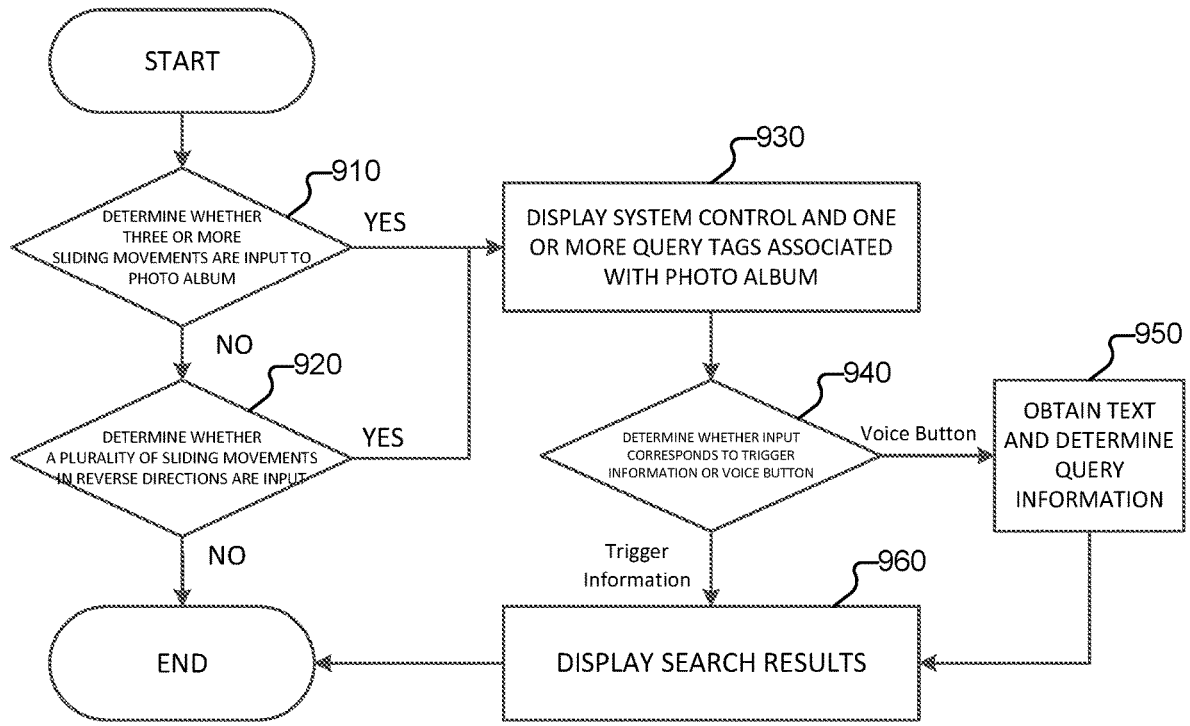
FIG. 9 is a diagram of an assistant control-assisted operation according to various embodiments of the present application.

FIG. 9 is a diagram of an assistant control-assisted operation according to various embodiments of the present application.

Referring to FIG. 9, process 900 for processing data is provided. Process 900 can be implemented in connection with process 100 of FIG. 1, process 400 of FIG. 4, process 500 of FIG. 5, process 600 of FIG. 6, and/or process 800 of FIG. 8. Process 900 can implement interface 200 of FIG. 2, interface 300 of FIG. 3, and/or interface 700 of FIG. 7. Process 900 can be implemented by computer system 1000 of FIG. 10.

In the case of a current application being a photos application (or a photo album application) and a user looking up a photograph in a photo album, a user can input various inputs to search for a photograph. The user can look up a photo by scrolling up, down, left, or right in a photo album. However, searching for a photo by scrolling can be difficult because the photo album or photos application can include a relatively large number of photos. If a user inputs a sliding movement three or more times (or another predefined number) rapidly (or within a predefined time period) in succession within the photo album, or when repeated sliding direction reversals are detected (e.g., searching by scrolling upward and then downward), the determination can be made that the user has a query need (e.g., the smart terminal can infer that the user has a query need). A customized system control can be displayed using a function button and query tags associated with the photo album as interface elements. For example, in response to inferring that the user has a query need based on the inputs that the user made in relation to the contacts directory application, the smart terminal can invoke a system control to assist the user with the query. In the example of the current context being a photo album application, the information tag can comprise at least one of the following: screenshot tag, recently-taken photo tag, specific ranking tag, and marked tag. The function button can comprise a voice input button. A screenshot tag may comprise snapshots of all the display content of captured screens. A recently taken photo tag may comprise the photos taken in the most recent time interval, such as one month. A specific ranking tag may be rankings according to time, content, or something else. A marked tag may comprise photos marked by the user in advance, e.g., marked as "liked" or favorite, etc.

The user can select a query tag or the voice input button within the system control to trigger a corresponding query message. The system control assists the user in executing the operation. For example, in response to selection of the "this month's pictures" information tag, the user can generate a query message for looking up the keyword "this month." The message is forwarded to the photo album, and the photo album uses the query message as a basis for looking up photos taken in the present month and displaying the photos. As another example, the user records "screenshot" using the voice input button. Thus, after the system control recognizes the speech signals, the system control generates a query message for looking up "screenshot" pictures. The system control then provides the query message to the photo album application, the photo album application looks up all screenshot pictures, and displays the resulting screenshot pictures.

In response to consecutive sliding movements or repeated reversals occurring on the photo album list page, the smart terminal (e.g., the system control) determines that the user is searching unsuccessfully for certain photos. The smart terminal proactively presents a display interface of a personal assistant (e.g., the system control). Moreover, the system control recommends the photos which the user is most likely to browse. The user can click the recommended photos or a voice input button and input a voice input to help the user in finding the desired photos.

Referring back to FIG. 9, process 900 can be invoked in response to obtaining an input to the smart terminal. For example, process 900 can be invoked in response to obtaining an input to a photo album application on the smart terminal.

At 910, the smart terminal determines whether a predefined number (e.g., three) of predefined inputs (e.g., sliding movements) is input to the photo album application.

In response to determining that a predefined number of predefined inputs have not been input to the photo album application at 910, process 900 proceeds to 920. In response to determining that a predefined number of predefined inputs have been input to the photo album application at 910, process 900 proceeds to 930.

At 920, the smart terminal determines whether a plurality of predefined movements (e.g., sliding movements) in reverse direction are input. For example, the smart terminal determines whether the user sequentially inputs an upward gesture and a downward gesture. For example, if the user uses an input (e.g., the sliding operation) continually (e.g., a predefined number of times within a threshold period of time), the terminal can deem such multiple or continuous inputs to correspond to the user not being able to find what the user wants, and the terminal can invoke the system control.

If the smart terminal determines that a plurality of predefined movements in a reverse direction are not input at 920, process 900 can end.

If the smart terminal determines that a plurality of predefined movements in a reverse direction are input at 920, process 900 proceeds to 930.

In some embodiments, at 910 and 920, the smart terminal determines whether the user has input an active-start input for invoking the smart control.

At 930, the smart terminal displays a customized system control. The system control can include a function button and one or more interface elements. The one or more interface elements can be associated with the photo album application. For example, the one or more interface elements can be photo-album associated query tags.

At 940, the smart terminal determines whether an input to the system control corresponds to trigger information or a voice input button. For example, the smart terminal determines whether an input to the system control is a selection of an interface element such as an information tag, or is a selection of a voice input button.

If the smart terminal determines that the input to the system control is a selection of the voice input button at 940, process 900 proceeds to 950. At 950, the smart terminal obtains text and determines query information. For example, in connection with selection of the voice input button, the smart terminal can record a voice input. The voice input is processed and text corresponding to the voice input is obtained (e.g., using speech-to-text processing implemented using library functions or API calls). The system control determines query information based on the text obtained from the voice input. Process 900 can then proceed to 960.

If the smart terminal determines that the input to the system control is trigger information at 940, process 900 proceeds to 960. The smart terminal can determine that the input to the system control is trigger information in the case of an input to the system control is a selection of an interface element such as an information tag. The system control can generate a query message (e.g., query information) based on the selection of an interface element such as an information tag. The system control can provide the query message to the display contacts application. The interface elements can comprise one or more recommended photos.

At 960, contacts results are displayed. The photo album application can obtain the query message from the system control and perform the corresponding query. The results of the query are provided to the user.

In the case of a current application storing or providing a relatively large amount of user data (e.g., very many photos or very many contacts), finding a specific piece of data can be difficult and inefficient. Various embodiments infer a user's intention, proactively understand a user's need, and promptly provide assistance so that the user can quickly find the desired data. For example, the smart terminal via a system control proactively presents the titles or icons of recently taken photos or the titles of photos marked as "liked." The user can click on the title or icons and directly browse the corresponding photos. If the recommended information tag does not correspond to the user's need, the user can input a query via a voice input (e.g., record "photos taken in Hangzhou in May") and thereby conduct a search to provide the needed photos.

The system control (e.g., the system-level assistant control) can be invoked at any time in various query contexts. Moreover, the display interface for the system control is customized according to query context. Accordingly, the system control can be called up at any time in connection with a user's need for help while operating in a certain application context and the system control can help the user complete the corresponding operation. As a system-level control, the system control (e.g., personal assistant) can be called up at any time and interact with applications at a deep level.

Figure 10:
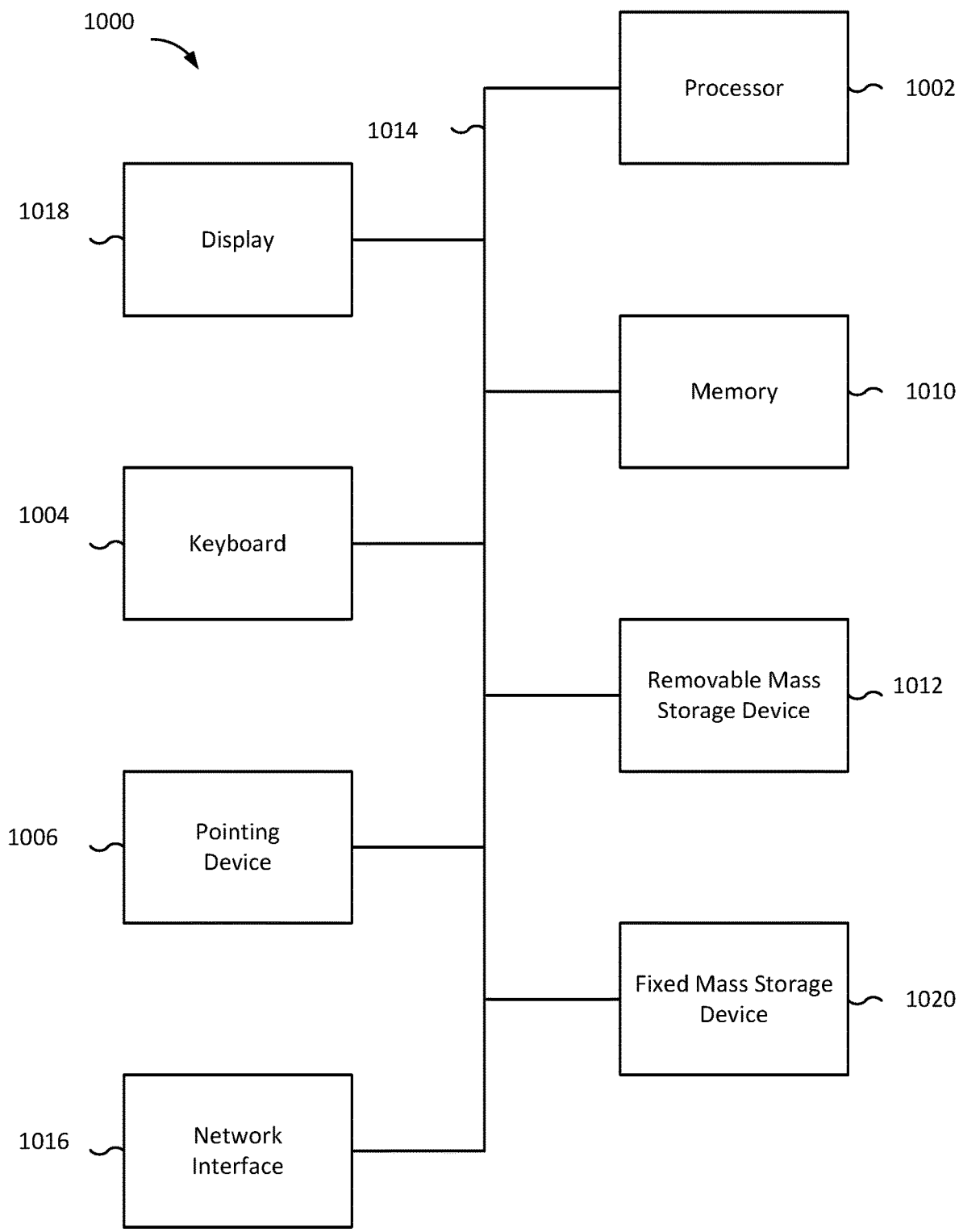
FIG. 10 is a functional diagram of a computer system for processing data according to various embodiments of the present disclosure.

FIG. 10 is a functional diagram of a computer system for processing data according to various embodiments of the present disclosure.

Referring to FIG. 10, computer system 1000 for processing data is provided. Computer system 1000 can be implemented in connection with process 100 of FIG. 1, process 400 of FIG. 4, process 500 of FIG. 5, process 600 of FIG. 6, process 800 of FIG. 8, and/or process 900 of FIG. 9. Computer system 1000 can implement interface 200 of FIG. 2, interface 300 of FIG. 3, and/or interface 700 of FIG. 7.

Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer-readable storage media, described below, depending on whether, for example, data access needs to be bi-directional or uni-directional. For example, processor 1002 can also directly and very rapidly retrieve and store frequently needed data in a cache memory (not shown). The memory can be a non-transitory computer-readable storage medium.

A removable mass storage device 1012 provides additional data storage capacity for the computer system 1000, and is coupled either bi-directionally (read/write) or uni-directionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storage device 1012 and fixed mass storage 1020 generally store additional programming instructions, data, and the like that typically are not in active use by the processor 1002. It will be appreciated that the information retained within mass storage device 1012 and fixed mass storage 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

An input unit of computer system 1000 can obtain numeric or character information input by a user, as well as control signals. The input unit can include a touchscreen, which can collect user touch operations thereon or nearby (e.g., an operation performed on the touch screen by the user employing a finger, stylus, or any other suitable object or accessory) and drive a corresponding connecting means according to a preset program. The input unit can be an input device other than a touchscreen, such as a physical keyboard, function keys (e.g., volume control keys or on-off keys), or a mouse.

A display of the computer system 1000 comprises a display panel. Optionally, it could be configured in the form of, for example, a liquid crystal display (LCD) or an organic light-emitting diode (OLED). A touchscreen may cover the display panel, forming a touch display screen. After detecting a touch operation on or near itself, this touch display screen sends it to the processor to execute corresponding processing. It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

Please note that all the method embodiments have been presented as a series of a combination of actions in order to simplify description. However, persons skilled in the art should know that embodiments of the present application are not limited by the action sequences that are described, for some of the steps may make use of another sequence or be implemented simultaneously in accordance with embodiments of the present application. Secondly, persons skilled in the art should also know that the embodiments described in the description are all preferred embodiments. The actions that they involve are not required by embodiments of the present application.

Various embodiments call (or invoke) a software program and/or a module and/or data stored in the memory, the processor being configured for displaying a system control upon receiving target input, the system control comprising interface elements associated with the current context; receiving an operating instruction provided through the system control as feedback; and responding to the operating instruction.

Optionally, it further comprises the step of determining interface elements associated with the current context: acquiring interface information or an application package name of the current app; using the application package name or interface information as a basis to determine at least one of the following interface elements: information tag or function button.

Optionally, the displaying a system control comprises: customizing a display interface of the system control according to the interface elements; starting a floating window with the application interface of the current application as the background; and displaying the display interface of the system control in the floating window.

Optionally, the receiving an operating instruction provided through the system control as feedback comprises: receiving an operating instruction based on triggering an interface element in the system control.

Optionally, the function button comprises a voice input button, and the receiving an operating instruction provided through the system control as feedback comprises: receiving speech signals based on triggering the voice input button; recognizing the speech signals; and generating an operating instruction based on recognized text data.

Optionally, the responding to the operating instruction comprises: analyzing the processing entity for the operating instruction and issuing the operating instruction to the processing entity for processing, wherein the processing entity comprises: the current application or system control.

Optionally, the analyzing the processing entity for the operating instruction comprises: detecting whether the current application can process the operating instruction; if the current application can process the operating instruction, then regarding the current application as the processing entity; if the current application cannot process the operating instruction, then the system control itself serving as the processing entity.

Optionally, after issuing the operating instruction to the system control for processing, it further comprises: going to the main page corresponding to the system control to process the operating instruction and exiting the system control.

Optionally, after issuing the operating instruction to the system control for processing, it further comprises: the system control determining a target application corresponding to the operating instruction, going to the target app, and exiting the system control.

Optionally, the displaying a system control comprises: displaying the system control upon receiving target input.

Optionally, the system input comprises: active-start input and passive-start input.

Optionally, the passive-start input comprises an upward sliding gesture, clicking a floating action button, a shaking operation, or a touchscreen double-tap operation.

Optionally, it further comprises: acquiring touchscreen sliding information, and using the sliding information as a basis to assess whether there is an upward sliding gesture.

Optionally, the sliding information comprises sliding distance and sliding direction.

Optionally, using the sliding information as a basis to assess whether there is an upward sliding gesture comprises: assessing whether the sliding direction is an upward sliding movement starting at the base; when the sliding direction is an upward sliding movement starting at the base, assessing whether the sliding distance is at least a target distance; and determining that it is an upward sliding gesture upon assessing that the sliding distance is at least a target distance.

Optionally, the sliding information further comprises: sliding time; after assessing that the sliding direction is an upward sliding movement starting at the base, it further comprises: assessing whether the sliding time is within a target time range.

Optionally, the active-start input comprises: at least one sliding input.

Optionally, it further comprises: acquiring touchscreen sliding information, wherein the touchscreen sliding information comprises sliding direction and sliding time; determining a target sliding operation based on the sliding direction; when the sliding time of the target sliding operation is greater than a predetermined time, recording as sliding input the target sliding operation; and when the number of attempts corresponding to the sliding input of the target sliding operation is greater than a validity threshold value, assessing that the sliding input is an active-start input.

Optionally, when the current context is a contact directory app, the information tag comprises at least one of the following: frequently-used contact tag, recently-called contact tag, and contact group tag; and the function button comprises: a voice input button.

Optionally, when the current context is a photo album app, the information tag comprises at least one of the following: screenshot tag, recent photo tag, specific ranking tag, and marked tag; and the function button comprises: a voice input button.

Optionally, when the current context is a system desktop, the information tag comprises at least one of the following: entry tag for recommended application and entry tag for most frequently-used app; and the function button comprises: a voice input button.

Optionally, when the current context is system settings, the information tag comprises at least one of the following: entry tag for recommended settings and entry tag for most frequently-changed settings; and the function button comprises: a voice input button.

Because the means embodiments are basically similar to the method embodiments, they are described in simpler terms. Refer to the corresponding section in a method embodiment as necessary.

Each of the embodiments contained in this description is described in a progressive manner. The explanation of each embodiment focuses on areas of difference from the other embodiments, and the descriptions thereof may be mutually referenced for portions of each embodiment that are identical or similar.

A person skilled in the art should understand that an embodiment of the present application may provide methods, means, or computer program products. Therefore, the embodiments of the present application may take the form of embodiments that are entirely hardware, embodiments that are entirely software, and embodiments that combine hardware and software aspects. Moreover, an embodiment of the present application may take the form of one or more computer program products implemented on computer-usable storage media (including but not limited to magnetic disk memory, CD-ROM, and optical memory) containing computer-usable program code.

In one typical configuration, the computer equipment comprises one or more processors (CPUs), input/output interfaces, network interfaces, and memory. Memory may include such forms as volatile memory in computer-readable media, random access memory (RAM) and/or non-volatile memory, such as read-only memory (ROM) or flash memory (flash RAM). Memory is an example of a computer-readable medium. Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media does not include transitory computer-readable media (transitory media) such as modulated data signals and carrier waves.

The embodiments of the present application are described with reference to flowcharts and/or block diagrams based on methods, terminal devices (systems), and computer program products of the embodiments of the present application. Please note that each process and/or block within the flowcharts and/or block diagrams and combinations of processes and/or blocks within the flowcharts and/or block diagrams can be implemented by computer commands. These computer program commands can be provided to the processors of general-purpose computers, specialized computers, embedded processor devices, or other programmable data-processing terminals to produce a machine. The commands executed by the processors of the computers or other programmable data-processing terminal devices consequently give rise to means for implementing the functions specified in one or more processes in the flowcharts and/or one or more blocks in the block diagrams.

These computer program commands can also be stored in computer-readable memory that can guide the computers or other programmable data-processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data-processing terminal devices and made to execute a series of steps on the computers or other programmable data-processing terminal devices so as to give rise to computer-implemented processing. The commands executed on the computers or other programmable data-processing terminal devices thereby provide the steps of the functions specified in one or more processes in the flowcharts and/or one or more blocks in the block diagrams.

Although preferred embodiments of the present application have already been described, persons skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Lastly, it must also be explained that, in this document, relational terms such as "first" or "second" are used only to differentiate between one entity or operation and another entity or operation, without necessitating or implying that there is any such actual relationship or sequence between these entities or operations. Moreover, the term "comprise" or "contain" or any of their variants are to be taken in their non-exclusive sense. Thus, processes, methods, things, or terminal devices that comprise a series of elements not only comprise those elements, but also comprise other elements that have not been explicitly listed or elements that are intrinsic to such processes, methods, things, or terminal devices. In the absence of further limitations, elements that are limited by the phrase "comprises a(n) . . . " does not exclude the existence of additional identical elements in processes, methods, things, or terminal devices that comprise the elements.

Detailed introductions were provided above to a data processing method, a data processing means, and a smart terminal provided by the present application. This document has applied specific examples to explain the principles and implementations of the present application. The above descriptions of the embodiments are only for the purpose of aiding the understanding of the methods and core concepts of the present application. A person with ordinary skill in the art will always be able to make modifications in keeping with the idea of the present application to specific embodiments and scopes of the application. The content of this specification should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, by one or more processors associated with a terminal, one or more user inputs to the terminal while a user is operating a current application;

determining, by the one or more processors associated with the terminal, that the user requires assistance via a system control while the user is operating the current application based at least in part on a manner by which the user interacts with the current application, wherein:

the manner by which the user interacts with the current application is based at least in part on the one or more user inputs to the terminal while the user is operating the current application;

a determination that the user requires assistance via the system control is performed without the user actively requesting invocation of the system control;

the determination that the user requires assistance via the system control is determined by a background process using the one or more user inputs while the user is operating the current application, wherein the background process runs at a level of an operating system, and the operating system runs on the terminal running on the terminal; and the determination that the user requires assistance via the system control is based at least in part on: one or more user interactions with the current applicaiton while the user is operating the terminal, and a one or more previously stored user interactions with applications or application types;

in response to the determination that the user requires assistance via the system control, providing, by the one or more processors associated with the terminal, the system control and at least a part of an interface of the current application to be displayed by a screen, wherein:

the system control is displayed as an overlay to the current application currently running on the terminal;

the system control is a function of the operating system of the terminal; and the system control comprises one or more interface elements associated with a current context of the terminal;

receiving, by the one or more processors associated with the terminal, an input to an interface element of the system control;

determining an operating instruction based at least in part on the input to the interface element of the system control; and performing, by the one or more processors associated with the terminal, one or more operations based at least in part on the operating instruction to execute one or more corresponding functions of the operating system of the terminal.

2. The method of claim 1, further comprising:

determining the one or more interface elements associated with the current context, comprising:

obtaining interface information of the current application or application package name of the current application; and determining the one or more interface elements based at least in part on the application package name, the interface information, or both.

3. The method of claim 1, wherein the providing the system control comprises:

customizing a system control display interface based at least in part on at least one of the one or more interface elements;

invoking a floating window with an application interface of the current application as a background; and providing the system control display interface in the floating window.

4. The method of claim 1, wherein the determining the operating instruction comprises:

obtaining the operating instruction based at least in part on a triggering of at least one of the one or more interface elements of the system control.

5. The method of claim 1, wherein the one or more interface elements comprise at least one information tag and at least one function button.

6. The method of claim 5, wherein the at least one function button comprises a voice input button, and the determining the operating instruction comprises:

obtaining speech signals in response to a triggering of the voice input button;

determining text data based at least in part on the speech signals; and generating the operating instruction based at least in part on the text data.

7. The method of claim 1, wherein performing the one or more operations based at least in part on the operating instruction comprises:

determining a processing entity for the operating instruction; and issuing the operating instruction to the processing entity for processing, wherein the processing entity comprises: the current application or the system control.

8. The method of claim 7, wherein the determining the processing entity for the operating instruction comprises:

determining whether the current application is capable of processing the operating instruction;

in response to determining that the current application is capable of processing the operating instruction, determining the current application to be the processing entity; and in response to determining that the current application is not capable of processing the operating instruction, determining the system control to be the processing entity.

9. The method of claim 7, further comprising:

in response to issuing the operating instruction to the processing entity wherein the processing entity corresponds to the system control, going to a main page corresponding to the system control to process the operating instruction; and exiting the system control.

10. The method of claim 7, further comprising:

in response to issuing the operating instruction to the processing entity wherein the processing entity corresponds to the system control, the system control determining a target application corresponding to the operating instruction; and launching the target application and exiting the system control.

11. The method of claim 1, wherein the displaying the system control comprises:

displaying the system control upon receiving a target input.

12. The method of claim 11, wherein the target input comprises: active-start input and passive-start input.

13. The method of claim 12, wherein the passive-start input comprises an upward sliding gesture, a clicking of a floating action button, a shaking operation, or a touchscreen double-tap operation.

14. The method of claim 13, wherein:
the receiving the one or more user inputs to the terminal while the user is operating the current application comprises:
obtaining touchscreen sliding information; and
the determining that the user require assistance via the system control comprises:
determining whether the target input corresponds to an upward sliding gesture based at least in part on the touchscreen sliding information.

15. The method of claim 14, wherein the sliding information comprises sliding distance and sliding direction.

16. The method of claim 15, wherein the determining whether the target input corresponds to the upward sliding gesture based at least in part on the sliding information comprises:
determining whether the sliding direction is an upward sliding movement starting at the base;
in response to determining that the sliding direction is the upward sliding movement starting at the base, determining whether the sliding distance is at least a target distance; and
in response to determining that the sliding distance is at least the target distance, determining that the target input corresponds to an upward sliding gesture.

17. The method of claim 16, wherein the sliding information further comprises:
a sliding time; and
in response to determining that the sliding direction is the upward sliding movement starting at the base, determining whether the sliding time is within a target time range.

18. The method of claim 12, wherein the active-start input comprises: at least one sliding input.

19. The method of claim 18, further comprising:
obtaining touchscreen sliding information for an input to the terminal, wherein the touchscreen sliding information comprises sliding direction and a sliding time;
determining a target sliding operation based at least in part on the sliding direction;
determining whether the sliding time is greater than a predetermined time;
in response to determining the sliding time of the target sliding operation is greater than the predetermined time, recording as sliding input of the target sliding operation;
determining whether a number of attempts corresponding to the sliding input of the target sliding operation is greater than a validity threshold value; and
in response to determining that the number of attempts corresponding to the sliding input of the target sliding operation is greater than the validity threshold value, determining that the sliding input corresponds to the active-start input.

20. The method of claim 1, wherein the one or more interface elements comprise at least one information tag and at least one function button, and if the current context is a contact directory application, the at least one information tag comprises at least one of the following: frequently-used contact tag, recently-called contact tag, and contact group tag; and the at least one function button comprises: a voice input button.

21. The method of claim 1, wherein the one or more interface elements comprise at least one information tag and at least one function button, and if the current context is a photo album application, the at least one information tag comprises at least one of the following: screenshot tag, recent photo tag, specific ranking tag, and marked tag; and the at least one function button comprises: a voice input button.

22. The method of claim 1, wherein the one or more interface elements comprise at least one information tag and at least one function button, and if the current context is a system desktop, the at least one information tag comprises at least one of the following: entry point tag for recommended application and entry point tag for most frequently-used app; and the at least one function button comprises: a voice input button.

23. The method of claim 1, wherein the one or more interface elements comprise at least one information tag and at least one function button, and if the current context is system settings, the at least one information tag comprises at least one of the following: entry point tag for recommended settings and entry point tag for most frequently-changed settings; and the at least one function button comprises: a voice input button.

24. The method of claim 1, wherein the one or more interface elements are separate from the interface of the current application.

25. A terminal, comprising:
a display;
one or more processors configured to:
receive one or more user inputs to the terminal while a user is operating a current application;
determine that the user requires assistance via a system control while the user is operating the current application based at least in part on a manner by which the user interacts with the current application, wherein:
the manner by which the user interacts with the current application is based at least in part on the one or more user inputs to the terminal while the user is operating the current application;
a determination that the user requires assistance via the system control is performed without the user actively requesting invocation of the system control;
the determination that the user requires assistance via the system control is determined by a background process using the one or more user inputs while the user is operating the current application, wherein the background process runs at a level of an operating system, and the operating system runs on the terminal running on the terminal; and
the determination that the user requires assistance via the system control is based at least in part on: one or more user interactions with the current application while the user is operating the terminal, and one or more previously stored user interactions with applications or application types;
in response to the determination that the user requires assistance via the system control, provide the system control and at least a part of an interface of the current application to be displayed by a screen, wherein:
the system control is displayed as an overlay to the current application currently running on the terminal;
the system control is a function of the operating system of the terminal; and the system control comprises one or more interface elements associated with a current context of the terminal;

receive an input to an interface element of the system control;

determine an operating instruction based at least in part on the input to the interface element of the system control; and perform one or more operations based at least in part on the operating instruction to execute one or more corresponding functions of the operating system of the terminal; and one or more memories coupled to the one or more processors, configured to provide the one or more processors with instructions.

26. A computer program product, the computer program product being embodied in a non-transitory computer readable storage medium and comprising computer instructions for:

receiving, by one or more processors associated with a terminal, one or more user inputs to the terminal while a user is operating a current application;

determining, by the one or more processors associated with the terminal, that the user requires assistance via a system control while the user is operating the current application based at least in part on a manner by which the user interacts with the current application, wherein:

the manner by which the user interacts with the current application is based at least in part on the one or more user inputs to the terminal while the user is operating the current application; and a determination that the user requires assistance via the system control is performed without the user actively requesting invocation of the system control;

the determination that the user requires assistance via the system control is determined by a background process using the one or more user inputs while the user is operating the current application, wherein the background process runs at a level of an operating system, and the operating system runs on the terminal running on the terminal; and the determination that the user requires assistance via the system control is based at least in part on: one or more user interactions with the current application while the user is operating the terminal, and one or more previously stored user interactions with applications or application types;

in response to the determination that the user requires assistance via the system control, providing, by the one or more processors associated with the terminal, the system control and at least a part of an interface of the current application to be displayed by a screen, wherein:

the system control is displayed as an overlay to the current application currently running on the terminal;

the system control is a function of the operating system of the terminal; and the system control comprises one or more interface elements associated with a current context of the terminal;

receiving, by the one or more processors associated with the terminal, an input to an interface element of the system control;

determining an operating instruction based at least in part on the input to the interface element of the system control; and performing, by the one or more processors associated with the terminal, one or more operations based at least in part on the operating instruction to execute one or more corresponding functions of the operating system of the terminal.

27. The method of claim 1, wherein the system control is displayed as the overlay to the current application based at least in part by invoking a floating window in which to provide the system control, and providing an interface for the current application in a background of the floating window.

28. The method of claim 1, wherein the system control is a background process of the operating system.

\* \* \* \* \*